(12) United States Patent
Varone

(10) Patent No.: US 7,899,666 B2
(45) Date of Patent: Mar. 1, 2011

(54) METHOD AND SYSTEM FOR AUTOMATICALLY EXTRACTING RELATIONS BETWEEN CONCEPTS INCLUDED IN TEXT

(75) Inventor: Marco Varone, Modena (IT)

(73) Assignee: Expert System S.p.A., Modena (IT)

( * ) Notice: Subject to any disclaimer, the term of this patent is extended or adjusted under 35 U.S.C. 154(b) by 970 days.

(21) Appl. No.: 11/744,479

(22) Filed: May 4, 2007

(65) Prior Publication Data

US 2008/0275694 A1 Nov. 6, 2008

(51) Int. Cl.
*G06F 17/27* (2006.01)
*G06F 17/21* (2006.01)

(52) U.S. Cl. .......................................... 704/9; 704/10

(58) Field of Classification Search ........................ None
See application file for complete search history.

(56) References Cited

U.S. PATENT DOCUMENTS

| | | | |
|---|---|---|---|
| 5,794,050 | A | 8/1998 | Dahlgren et al. |
| 6,006,221 | A | 12/1999 | Liddy et al. |
| 2003/0130976 | A1 | 7/2003 | Au |
| 2003/0217052 | A1 | 11/2003 | Rubenczyk |
| 2003/0217335 | A1* | 11/2003 | Chung et al. ................ 715/514 |
| 2004/0034652 | A1 | 2/2004 | Hofmann et al. |
| 2005/0049852 | A1 | 3/2005 | Chao |

(Continued)

FOREIGN PATENT DOCUMENTS

WO WO2005003390 4/2005

WO WO2005033909 4/2005

OTHER PUBLICATIONS

Edmonds et al., "Near-Synonymy and Lexical Choice", Computational Linguistics, vol. 28, Issue 2, pp. 105-144, Jun. 2002.*

(Continued)

*Primary Examiner* — Brian L Albertalli
(74) *Attorney, Agent, or Firm* — Convergent Law Group LLP

(57) ABSTRACT

A method and system for automatically extracting relations between concepts included in electronic text is described. Aspects the exemplary embodiment include a semantic network comprising a plurality of lemmas that are grouped into synsets representing concepts, each of the synsets having a corresponding sense, and a plurality of links connected between the synsets that represent semantic relations between the synsets. The semantic network further includes semantic information comprising at least one of: 1) an expanded set of semantic relation links representing: hierarchical semantic relations, synset/corpus semantic relations verb/subject semantic relations, verb/direct object semantic relations, and fine grain/coarse grain semantic relationship; 2) a hierarchical category tree having a plurality of categories, wherein each of the categories contains a group of one or more synsets and a set of attributes, wherein the set of attributes of each of the categories are associated with each of the synsets in the respective category; and 3) a plurality of domains, wherein one or more of the domains is associated with at least a portion of the synsets, wherein each domain adds information regarding a linguistic context in which the corresponding synset is used in a language. A linguistic engine uses the semantic network to performing semantic disambiguation on the electronic text using one or more of the expanded set of semantic relation links, the hierarchical category tree, and the plurality of domains to assign a respective one of the senses to elements in the electronic text independently from contextual reference.

55 Claims, 10 Drawing Sheets

U.S. PATENT DOCUMENTS

| | | | |
|---|---|---|---|
| 2006/0074980 | A1 | 4/2006 | Sarkar |
| 2007/0106493 | A1* | 5/2007 | Sanfilippo et al. ............... 704/9 |
| 2007/0174041 | A1* | 7/2007 | Yeske ............................ 704/3 |
| 2007/0282598 | A1* | 12/2007 | Waelti et al. ................... 704/10 |
| 2008/0201133 | A1* | 8/2008 | Cave et al. ..................... 704/10 |
| 2008/0215313 | A1* | 9/2008 | Waelti et al. .................. 704/10 |

OTHER PUBLICATIONS

Agirre et al., "Clustering WordNet Word Senses", Proceedings of the Conference on Recent Advances on Natural Language, pp. 121-130, 2006.*

Magnini et al., "Integrating Subject Field Codes into WordNet", Proceedings of LREC-2000, Second International Conference on Language Resources and Evaluation, pp. 1413-1418, Jun. 2000.*

Gangemi et al., "The OntoWordNet Project: extension and axiomatization of conceptual relations in WordNet", Proc. of On the Move to Meaningful Internet Systems, pp. 820-838, 2003.*

Oltramari et al., "Restructuring WordNet's Top-Level: The OntoClean approach", Workshop Proceedings of OntoLex'2, Ontologies and Lexical Knowledge Bases, pp. 17-26, May 2002.*

HTTP://XWN.HLT.UTDALLAS.EDU/WSD.HTML, "Semantic Annotation of WordNet Glosses", Mar. 24, 2007, Published in: US.

* cited by examiner

Sentence Analysis Stage

METHOD AND SYSTEM FOR AUTOMATICALLY EXTRACTING RELATIONS BETWEEN CONCEPTS INCLUDED IN TEXT

BACKGROUND OF THE INVENTION

The language knowledge needed to process complex language comprises several categories, three of which include, 1) morphology—of the study of meaningful components of words; 2) syntax—the study of structural relationships between words; and 3) semantics—the study of meaning or senses of words. In automatic natural language processing systems, human languages are parsed by computer programs. However, human sentences are not easily parsed by programs, as there is substantial ambiguity in the structure of human language. Therefore, natural language processors use the categories of linguistic knowledge for resolving ambiguity at one of these levels. A word, phrase, sentence, can be considered ambiguous if it can be interpreted in more than one way, i.e., if more than one linguistic structure can be associated with it. For example, syntactic ambiguity arises when a sentence can be parsed in more than one way. Lexical ambiguity arises when context is insufficient to determine the sense of a single word that has more than one meaning. And semantic ambiguity arises when a word or concept has an inherently diffuse meaning based on widespread or informal usage.

Because different natural languages are structured differently, there are different approaches to natural language processing for different types of languages. For example, the processing of Latin or Anglo-Saxon languages requires a different approach than for the processing Arabic or Asian languages, for instance. However, no matter of the language being processed, the models and algorithms comprising natural language processors use the categories of linguistic knowledge to resolve or disambiguate these ambiguities. In the evolution of automatic natural language processing, different combinations of these language knowledge categories have been used in varying degrees.

The first type of linguistic processors commercially developed utilized a morphological and speech tagging approach. The morphological approach uses parsing algorithms that attempt to recognize different words having the same root. So example, if the word "work" is a root, the words "working," "worked," and "works" share that same root word. Thus, the first type of linguistic technology focuses on morphological recognition of a word, and is the starting point for any linguistic technology.

Any linguistic processor that performs morphological recognition has two requirements. One is the use of a stored dictionary of words. The dictionary stores not only a list of words comprising a particular language, but also information pertaining to reach other words. Some basic information stored for the words includes a morphological listing of root words.

The second requirement for any linguistic processor is part-of-speech tagging, also called grammatical tagging. In this process, the words in the text are marked as corresponding to a particular part of speech, based on both its dictionary definition, as well as its context—i.e., relationship with adjacent and related words in a phrase, sentence, or paragraph. When attempting to recognize words in the text, the linguistic processor utilizes grammatical rules to define which words are nouns, verbs, adjectives, adverb, and so on. There are many approaches for performing text analysis, such as Lexical Functional Grammar (LFG), for example.

The morphological and grammatical analyses described above are the two basic elements required for any linguistic processor that performs natural language processing. Processing text using only morphological analysis and grammatical analysis is referred to as a shallow linguistic processing or tagging.

The next step of linguistic analysis beyond the shallow approach is deep linguistic processing. Deep linguistic processing involves sentence analysis and uses the outcome of shallow linguistic processing to determine sentence structures (e.g., identifying the subject, the object, the verb, the direct object, and so on. Sentence analysis is much more language specific than the other steps in the process because there are significant sentence structure differences between languages. Sentence analysis has been introduced into commercial systems, but has been used sparingly because it is a step in the process that requires a significant amount of time over those employing shallow approaches. It is believed that between 70 to 80% of today's commercially available natural language linguistic processors perform shallow linguistic processing.

Typically, existing algorithms for sentence analysis are mainly based on proximity and group recognition. In this approach, the verb is used as a starting point for finding a relevant set of text, and then other elements are recognized such as the subject, object, and complements. Typically, the majority of published algorithms use a proximity concept that uses heuristics such as, the subject is before the verb, the adjective follows the transitive verb, and so on. Also, semantic information is used to during this analysis.

The final step of deep linguistic processing is semantic disambiguation. In existing systems, semantic disambiguation is mainly implemented in restrictive domains, meaning that to have a semantic understanding of the text, the system first requires an understanding of the contextual reference or main concept inside the text.

Despite the approaches described above, the field of automatic natural language processing hasn't yet reached the status of mainstream technology nor had related commercial success. This may be due to at least the following disadvantages. One disadvantage is that nearly all conventional approaches to semantic disambiguation use statistical approaches to address complex issues, such as word sense disambiguation. In order to simplify the complexity of the problem, several approaches consider, in one way or in another, the use of statistics as the key to enable natural language processing. For example, Pat. US 2005/0049852A1 describes a system based on probabilistic grammar analysis and statistic training to improve the results of each step of the analysis. However, this approach fails to provide the level of precision and quality that is required to ensure that the automatic management of unstructured information is a viable alternative, especially in complex scenarios. This quality level can be achieved only if the complexity is considered and faced in its entirety.

Another disadvantage is the reliance on genetic algorithms. The genetic approach is usually used in conjunction with the statistical and narrow macro approach to improve the quality of the results of the semantic disambiguation. The genetic approach attempts to make better use of the information extracted from the statistical approach. While the genetic approach may slightly improve the quality of the results of semantic disambiguation, a system for real use has yet to be demonstrated that provides sufficient quality of the semantic understanding of the text. This attempt to simplify the processing based on the reduction of the possible combinations to be analyzed (e.g., Patent WO 2005/033909 A2) limits the capability to maximize the precision of the analysis, causing again lower precision in the disambiguation and in the extraction of links between the concepts identified in the text.

A further disadvantage is that both statistical and narrow macro approaches require that the natural language processing system first be trained to perform semantic disambiguation using a set of examples that contain the type of information the system trying to understand. The system learns the content of the training examples and creates mechanical rules for performing the semantic disambiguation later. Requiring that the system be trained prior to use can be inefficient and time-consuming.

Accordingly, there is a need for an improved computer-implemented method for automatically extracting relations between concepts included in text.

BRIEF SUMMARY OF THE INVENTION

A method and system is provided for automatically extracting relations between concepts included in electronic text. Aspects the exemplary embodiment include a semantic network comprising a plurality of lemmas that are grouped into synsets representing concepts, each of the synsets having a corresponding sense, and a plurality of links connected between the synsets that represent semantic relations between the synsets. The semantic network further includes semantic information comprising at least one of: 1) an expanded set of semantic relation links representing: hierarchical semantic relations, synset/corpus semantic relations verb/subject semantic relations, verb/direct object semantic relations, and fine grain/coarse grain semantic relationship; 2) a hierarchical category tree having a plurality of categories, wherein each of the categories contains a group of one or more synsets and a set of attributes, wherein the set of attributes of each of the categories are associated with each of the synsets in the respective category; and 3) a plurality of domains, wherein one or more of the domains is associated with at least a portion of the synsets, wherein each domain adds information regarding a linguistic context in which the corresponding synset is used in a language A linguistic engine uses the semantic network to performing semantic disambiguation on the electronic text using one or more of the expanded set of semantic relation links, the hierarchical category tree, and the plurality of domains to assign a respective one of the senses to elements in the electronic text independently from contextual reference.

According to the method and system disclosed herein, the exemplary embodiment enables deep linguistic analysis and disambiguation of text in a manner that ensures a complete understanding of the context of the text without relying on the use of statistics or requiring pre-training.

DETAILED DESCRIPTION OF THE INVENTION

Figure 1:
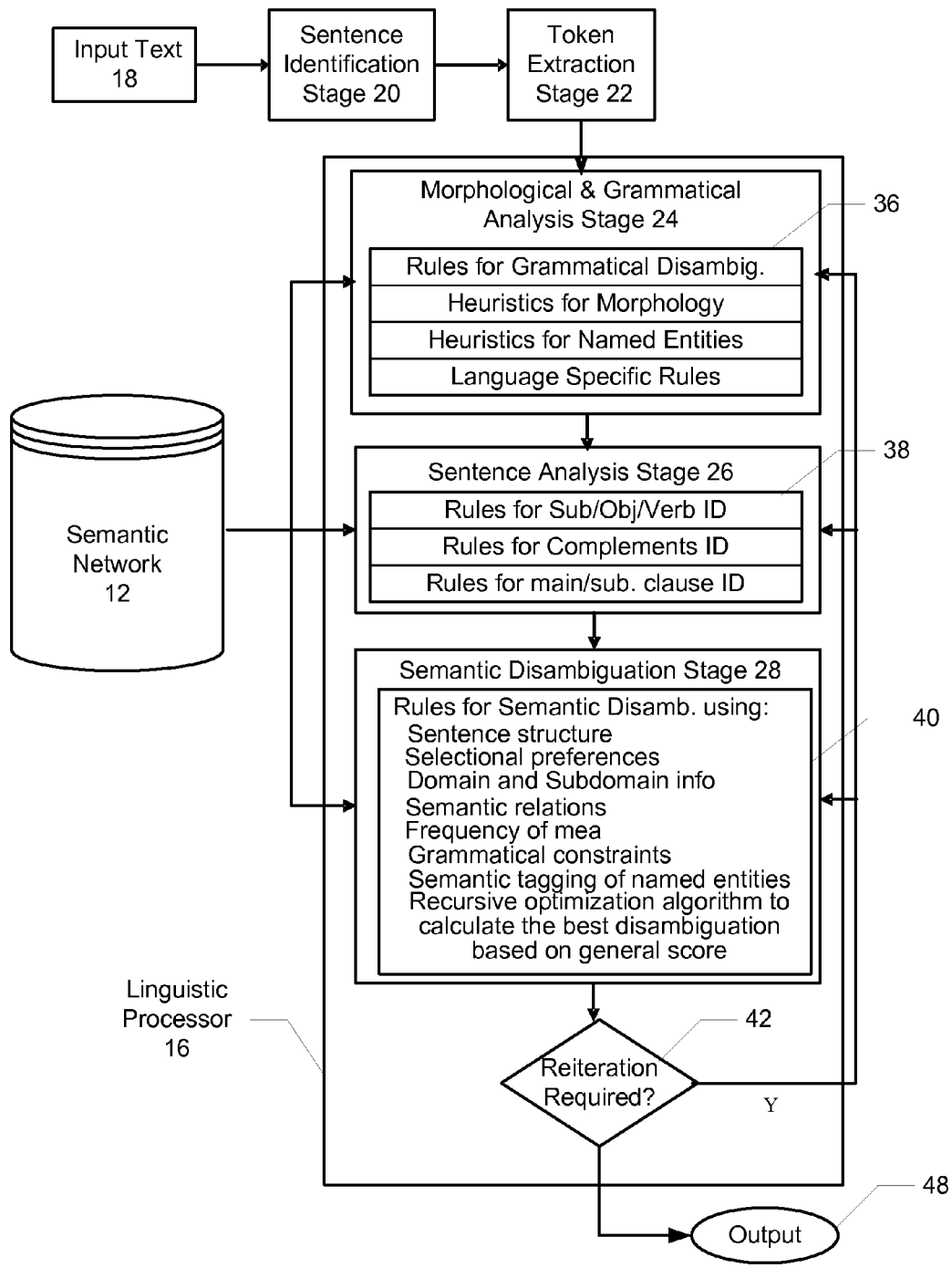
FIG. 1 is a block diagram illustrating an improved system for automatically extracting relations between concepts included in text according to an exemplary embodiment.

The present invention relates to automatically extracting relations between concepts included in text. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The embodiments disclosed herein are mainly described in terms of particular device and system provided in particular implementations. However, one of ordinary skill in the art will readily recognize that this method and system will operate effectively in other implementations. For example, database schemas and hardware platforms usable with the present invention can take a number of different forms. The present invention will also be described in the context of particular methods having certain steps. However, the method and system operate effectively for other methods having different and/or additional steps not inconsistent with the present invention.

Before describing the exemplary embodiments of the present invention, a brief overview of lexical semantics and semantic networks is provided. Lexical semantics is a subfield of linguistics that relates to how and what the words of a language denote. Lexical semantics covers theories of the classification and decomposition of word meaning, and the relationship of word meaning to sentence meaning and syntax. Lexical semantics play an essential role in natural language comprehension.

Example types of semantic relations include homonymy, homophones, homographs, synonymy, hyponymy, hypernymy, and polysemy. A homonym is defined as a relation that holds between words that have the same form with distinct and unrelated meanings. For example, the word "bank" can mean a financial institution, or a sloping mound. In contrast, homophones are words with the same pronunciation but have different spellings, i.e., distinct words with a shared pronunciation. Homographs referred to pairs of words with identical orthographic forms but different pronunciations. Example homographs are the word "bass" referring to a fish, and the word "bass" referring to a deep sound. A synonym refers to different words sharing the same meaning. In other words, two words are considered synonyms if they can be substituted for one another in a sentence without changing the meaning of the sentence, e.g., the words big and large. A hyponymy is a restricted class of pairs of words having similar but not identical meanings (homonyms) that denotes one word is a subclass of another. For example, the relationship between jet and airplane is one of hyponymy. This relationship is not symmetric and the term hyponym is used to refer to the more specific word, while the term hypernym is used to refer to the broader one.

As opposed to the definition of a homonymy that requires multiple words to have distinct and unrelated meanings, a polysemy refers to a single word having multiple related meanings. For example, although the word "bank" that supplies sperm is not a reference to a financial institution, the term has a range of meanings related to repositories for biological matter, e.g., sperm bank and blood bank. This sense of the form bank does not meet the definition of a homonymy because the meaning of bank in this example is not distinct and unrelated to the financial institutions sense. A polysemy allows this sense of the bank to be related to and perhaps be derived from the financial institution sense without requiring that it be a distinct word.

Attempts have been made to capture some forms of lexical semantics in lexical semantics databases. One type of lexical semantics database is a semantic network. In a semantic network, individual word entries are referred to as lexemes or lemmas (hereinafter lemmas). A lemma is a pairing of a particular orthographic form with some form of symbolic meaning representation. The lemmas are represented as nodes in a graph and the relations among lemma's and their senses in the semantic network are represented by named links connecting the nodes that represent semantic relations between the lemmas. The term "sense" may be used to refer to a lemma's meaning component.

An example of an existing semantic network is WORDNET, which a lexical database of the English language. WordNet consists of three separate databases, one each for nouns and verbs, and a third for adjectives and adverbs. Each of these three databases consists of a set of lexical entries corresponding to unique orthographic forms, accompanied by sets of senses associated with each form. WORDNET'S sense entries consist of a set of synonyms, a dictionary-style definition, or gloss, and some example uses. WORDNET includes a set of domain-independent lexical relations that hold between WORDNET lemmas/senses. For example, the implementation of a synonymy in WORDNET is done by organizing lexical entries that are synonyms into a sysnet, a set of synonyms. Besides the list of synonyms, each can set includes an associated definition and example uses. Each synset can be taken to represent a concept that has become lexicalized in the language. Thus, synsets are used to represent concepts as a list of entries that can be used to express the concept. Hyponymy relations in WORDNET are represented by relating each synset to its immediately more general and more specific synsets via direct hypernym and hyponym relations.

Although WORDNET is a useful database of lexical relations, WORDNET has some disadvantages. One disadvantage is that the primary use of WORDNET is for human browsing, and is therefore ill-suited for automated natural language processing. In addition, WORDNET involves fairly loose semantic associations and makes no attempt to distinguish homonymy from polysemy. Furthermore, WORDNET represents concepts using the notion of sysnets, rather than representing concepts using logical terms. Accordingly, even if WORDNET were organized for automated natural language processing, the structure and content of WORDNET would not enable automatic deep linguistic analysis of text.

The present invention provides an improved system for automatically extracting relations between concepts included in text through deep linguistic analysis, which overcomes the limitations of traditional systems (keyword-based or statistic-based) to manage unstructured information.

FIG. 1 is a block diagram illustrating an improved system for automatically extracting relations between concepts included in text according to an exemplary embodiment. The system 10 includes a semantic network 12, a declarative language 14, and a linguistic processor 16. The system 10 is preferably a software system that uses deep linguistic or semantic analysis to identify concepts included in an input electronic text 18 and automatically extracts and outputs the relations linking the concepts.

The deep linguistic analysis performed by the linguistic processor 16 through the use of the semantic network 12 and the declarative language 14 includes a combination of morphological analysis, grammatical analysis, syntax analysis, and semantic disambiguation. Accordingly, in the exemplary embodiment, the linguistic processor 16 includes a sentence identification stage 20, a token extraction stage 22, a morphological and grammatical analysis stage 24, a sentence analysis stage 26, and a semantic disambiguation stage 28.

In one exemplary embodiment, the linguistic processor 16 is implemented as a software program that is executed on a computer or networked server (not shown) that includes one or more processors and memories for executing programs. The semantic network 12 and/or declarative language 14 may be located on the same or different computer than the linguistic processor 16. The linguistic processor 16 also may be implemented with more or a less number of stages than that shown. In an alternative embodiment, the linguistic processor 16 may be implemented in hardware, or a combination of hardware and software.

The semantic network 12 enables the linguistic processor 16 to perform deep linguistic analysis. In one exemplary embodiment, the semantic network 12 is created manually by expert linguists and represents more than a simple ontology. Like existing semantic networks, the semantic net 12 is a database for representing the meaning of words in a particular natural language. However, compared to existing networks, the semantic network 12 of the exemplary embodiment includes an improved structure that provides a richer and more complete representation of the language that is used by the linguistic to processor 16 to analyze the input text 18. The semantic network 12 stores information including selective constraints on subject or object, contextual co-occurrences, semantic categories and domains, and conceptual relations. Thus, the semantic network 12 provides the system with the knowledge needed to recognize, for example, the same concept even if expressed in different ways or forms (including an anaphora—a reference to a word or phrase used earlier using a pronoun, for example) and identify relations of connection, belonging to, class, location, and others.

Compared to other existing semantic networks, the semantic network 12 of the present invention provides a richer and more comprehensive representation of the English language. The semantic network 12 is also an improvement over prior art because the semantic network 12 provides a much richer representation of the language using a structure that is optimized for automatic analysis by the linguistic processor 16, as described further below. In addition, the semantic network 12 includes a representation of the relationships between the elements of the text 18 independently from the contextual reference of the corpus of the text 18.

Referring still to FIG. 1, in operation, text 18 to be analyzed is input to linguistic processor 16 and in response, the sentence identification stage 20 identifies any sentences in the text 18, and the token extraction stage 22 identifies individual word tokens, which may comprise letters and apostrophes in each of the sentences. Both sentence identification and token extraction are well-known in the art and outside the scope of this document.

The morphological and grammatical analysis stage 24 uses both information available in the semantic network 12 and grammatical disambiguation rules 36 to perform grammatical disambiguation. Rules for grammatical disambiguation are used to identify the word's grammatical type (noun, adjective, verb, adverb etc.) and assign a corresponding tag to the word. Morphological heuristics are used to identify relations between a concrete word form appearing in the text 18 and its invariant (lemma) are identified. Heuristics for named entities are used for identification of named entities, which are proper nouns used to represent anything identified by a proper name, such as persons, companies, places, dates, addresses, phone numbers, measures, amounts of money, and the like. In the exemplary embodiment, recognition of these entities is done heuristically. Alternatively, one or more small dictionaries of proper nouns could also be used. Language specific rules can be incorporated into any of the steps to handle language specific morphological and grammatical assignments.

Thereafter, the sentence analysis stage 26 takes the tagged words and uses information in the semantic network 12 and logic analysis rules 38 to identify structural elements of each sentence, including subject, object, verb, complements, and main and subordinate clauses, and outputs the resulting structural elements.

During the semantic disambiguation stage 28, the linguistic processor 16 uses semantic information in the semantic network 12 and rules for semantic disambiguation 40 to assign senses/meanings to the structural elements. The semantic information in the semantic network 12 used to assign senses includes the set of senses associated with the lemmas and synsets, as well as any combination of the following: 1) an expanded set of semantic relation links between the synsets representing: hierarchical semantic relations, synset/corpus semantic relations verb/subject semantic relations, verb/direct object semantic relations, and fine grain/coarse grain semantic relationship. 2) A hierarchical category tree having a plurality of categories for assigning attributes for synsets. Each of the categories contains a group of one or more synsets and a set of attributes, wherein the set of attributes of each of the categories are associated with each of the synsets in the respective category. And 3) a plurality of domains associated with the synsets that add information regarding a linguistic context in which the corresponding synset is used in a language. In one embodiment, one function of the categories and domains is to allow the linguistic processor 16 to distinguish and disambiguate a meaning of a synset from other synsets having common lemmas.

In response receiving the structural elements output by the analysis stage 26, the linguistic processor 16 searches the semantic network 12 for a matching lemma. Once a matching lemma is found, the linguistic processor 16 uses the expanded set of semantic relation links of the synsets containing the matching lemma to retrieve the senses of related synsets. The categories and domains are used for disambiguating the senses of synsets having common lemmas. Based on the disambiguation, the linguistic processor 16 assigns one of those senses to the structural element. In addition, any polysemic words present in the text 18 are identified, and a recursive optimization algorithm 42 is used to calculate the best possible sense/meaning to assign to each of the polysemic words independently from the contextual reference of the corpus of the text 18 analyzed.

According to a further aspect of the exemplary embodiment, the linguistic processor 16 includes a hashing algorithm that enables direct and unique access to a record in the semantic network 12 database. By directly accessing to a record of a lemma/synset in the semantic network 12 through an application of the hashing algorithm, the linguistic processor 16 provides faster access to the contents of the semantic network 12 over traditional tree traversal without any compromise in terms of the quality of disambiguation.

The output 48 of the linguistic processor 16 includes a representation of the relationships between the elements of the text 18. In an exemplary embodiment, the output file 48 may contain the following: A list of all the concepts recognized in the text; a list of all named entities recognized in the text; a sequence, in terms of sentences, of the concepts and the entities as they appear in the text; a list of sentences; a list of clauses inside the sentences where every clause is recognized as main, coordinate to main, secondary, coordinate to secondary; for every secondary clause, a type is included (like relative or subjective); for every clause, the phrases contained in it; every phrase has a type (like noun phrase or verb phrase); a list of all concepts and entities grouped for their semantic category; sentence relations between the concepts/entities: subject, direct objects, indirect objects and complements; a list of the most relevant concepts/entities; general domains that are relevant for the text, with a relevance score associated to each of domain; a list of solved anaphora/coreference with the relation between the entity and the elements used to express it in the text; and for each concept/entity, a list of all concepts/entities linked to it based on logical or semantic links.

Using the semantic network 12, the linguistic processor 16 uses its various algorithms to analyze the text 18 in a way similar to what people do when they read documents. The disambiguation performed by the linguistic processor 16 ensures a complete understanding of the context of the text 18 and the determination of relations between the elements of the text 18 independently from the contextual reference of the corpus or main part of the input text 18.

According to the exemplary embodiment, the improved semantic disambiguation provided by the system 10, performed independent from contextual reference, can be used to provide improve quality in many areas including: natural language processing (NPL); electronic searches (precision and recall); automatic classification of documents; and targeted extraction of information from unstructured textual sources.

Thus, in one embodiment, the linguistic processor 16 can be used to provide a new type of ranking system for search engines that surpasses the results obtained through traditional keyword based searches (even when integrated by statistical analysis elements). Instead of considering only the presence or the number of occurrences of one or more keywords, semantic based ranking first determines the concept that the keyword search contains, analyzes the documents returned from a keyword search to identify the concepts the documents contain, and then ranks the documents using a specific relevance that a concept (or some concepts) has inside the documents when compared to the concepts identified in the keyword search.

Figure 2:
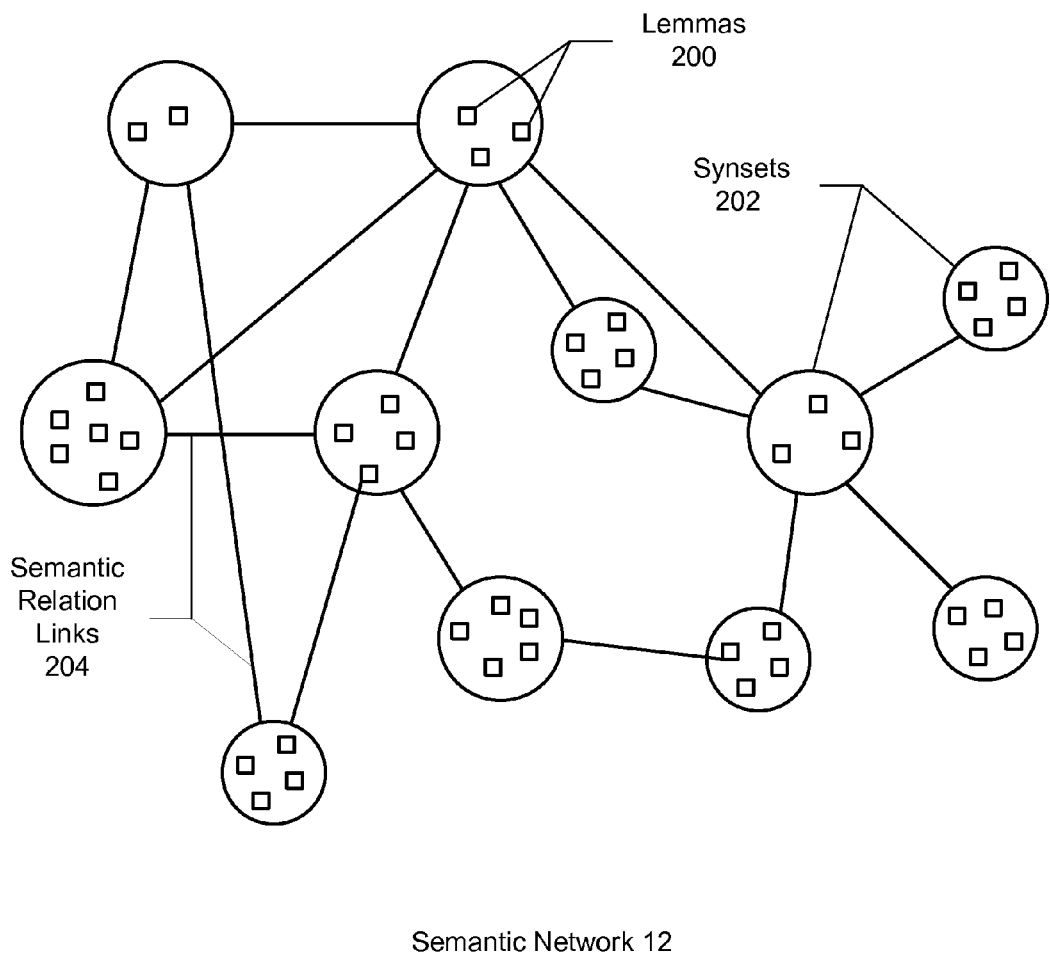
FIG. 2 is a diagram graphically illustrating contents of the semantic network.

FIG. 2 is a diagram graphically illustrating contents of the semantic network 12. The semantic database 12 is a lexical database organized on a conceptual base (rather than alphabetical order as a dictionary). Individual entries or records in the semantic network 12 are referred to as lemmas 200. The lemmas 200 are grouped into sets of synonyms called synsets 202, which graphically represent concepts as nodes in a graph. The synsets 202 are built according to the principle of synonymy. According to this principle, lemmas 200 with a different orthographic form or "signifier" have the same meaning and describe the same concept. The term "sense" or "gloss" refers to a synset's (and also the lemmas 200 it contains) meaning component. Meaning is therefore represented by a set of synonyms. A synset 202 may have only one lemma 200, in the case where there are no synonyms for that particular lemma 200. However, a lemma 200 may belong to more than one synset 202. A plurality of links 204, each connected between a pair of synsets 202, represent semantic relations between the lemmas/synsets.

The characteristics and the meaning of the linked synsets 202 enrich and help to define each synset 202. Because synsets 202 are groups of one or more synonyms, and two lemmas 202 that belong to different grammatical categories cannot be synonyms, the synsets 202 are preferably divided into grammatical categories such as nouns, verbs, adjectives, adverbs.

Unlike conventional semantic networks, the semantic network 12 is provided with a series of attributes and information structured in such a way to be easily and rapidly accessible and understandable by software programs. Therefore, the semantic network 12 represents a significant improvement over conventional semantic networks in several areas:

Expanded Definition of a Lemma

The lemmas 200 are the access-keys to the semantic network 12, the mechanism to access to the information contained in the synsets 202 that are the meaning units in the semantic network 12. Each of the lemmas 200, considered as signifier, may have, in fact, many meanings and, therefore, can belong to more than one synset 202.

Figure 3:
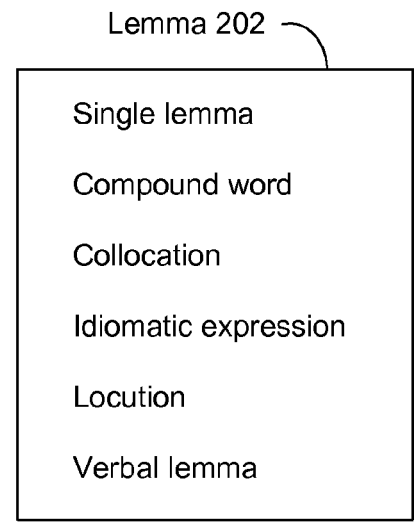
FIG. 3 is a diagram illustrating the expanded definition of a lemma.

FIG. 3 is a diagram illustrating the expanded definition of a lemma 200. According to the exemplary embodiment, the signifier for each lemma 200 may be entered and stored in the semantic network 12 in any of the following forms:

Single word (e.g., "chair", "holiday", "work", "study", "beautiful", "rapid", "rapidly", "very", etc.);

Compound word ("blackbird", "cookbook", "mother-in-law");

Collocation—Collocations are elements occurring together, co-occurring in use, i.e., sequences of words difficult to divide on a semantic level. Examples collocations include "credit card", "overhead projector", "landing field", etc.;

Idiomatic expression—Idiomatic expressions are lexicalized concepts, such as "to fly off the handle", which means to become very angry; "to weigh anchor", which means to sail;

Locution—Locutions are groups of words that express a simple concept that cannot be expressed by a single word. A locution typically has the form (nominal group+nominal group, verb+nominal group). Usually locutions occupy upper nodes in the semantic network 12, that express the more abstract concepts (e.g., categories) and concepts that cannot be represented by simple signifiers ("cat. people with institutional title", etc);

Verbal lemma, such as: a verb in the infinitive form (e.g. "to eat", "to run", "to sleep"), and a verbal collocation (e.g. "to sneak away"). Categories are explained further below.

Expanded Set of Semantic Relationships among Synsets

The meaning of a synset 202 derives not only from the concept expressed by its lemmas 200 (synonyms) but also from the semantic relationships linking it with other synsets 202. As described above, natural language is, such as English, include many semantic relationships. However, conventional semantic nets may only contain a small portion of the different types of these semantic relationships, i.e., hypernyms/hyponyms and holonym/meronym for noun synsets, and hypernym/troponym for verb synsets. Therefore they offer limited capability to provide the basis for a complete grammatical and semantic disambiguation and therefore hinder the development of effective commercial domain-independent natural-language processing systems.

Figure 4:
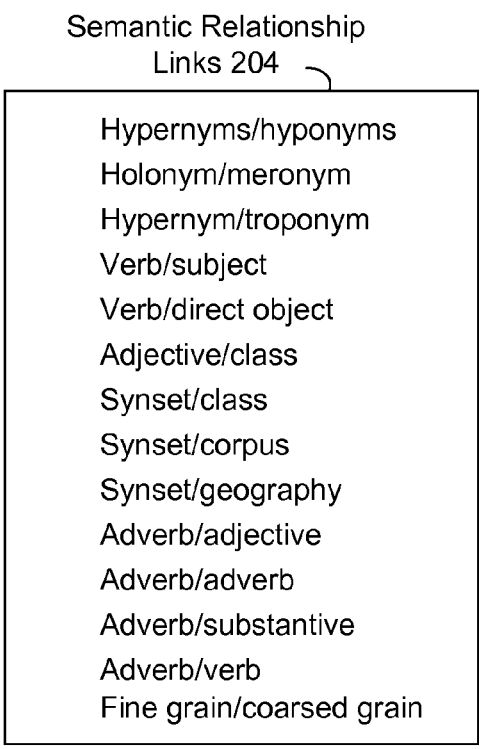
FIG. 4 is a diagram graphically illustrating the expanded set of semantic relation links included in the semantic network.

FIG. 4 is a diagram graphically illustrating the expanded set of semantic relation links included in the semantic network 12. The semantic network 12 may include links representing the main semantic relationships of hypernyms/hyponyms and holonym/meronym for noun synsets, and hypernym/troponym for verb synsets, which are hierarchical in nature. However, in addition to hierarchical links, the semantic network 12 of the exemplary embodiment may also includes links 204 representing the following types of semantic relationships:

Synset/corpus
Verb/subject
Verb/direct object
Fine grain/coarse grain
Adjective/class
Synset/class
Synset/geography
Adverb/adjective
Adverb/adverb
Adverb/substantive
Adverb/verb Particular types of these semantic relationships are particularly important for their role in increasing the capability of the system 10 to "understand" natural language. For example, the link synset/corpus represents the semantic relationship linking synsets that can be frequently found together in the same context. This link leverages the results of an analysis of the text 18 to provide additional information to increase the precision of the disambiguation process.

The link verb/subject represents the semantic relationship linking lemmas 200 identified as verbs with possible subjects. For example, the verb "To eat" as taking in food with subjects, such as Animals, People, or the verb "to drive" a vehicle with subjects, such as people, men, women, an so forth.

The link verb/object links represents the semantic relationship linking lemmas 200 identified as verbs with noun lemmas 200 that are possible objects for the verb, e.g., the verb "to write" music, book objects, or the verb "to eat" steak, pasta objects, and so on.

The link fine grain/coarse grain represents the semantic relationship linking synsets 202 having similar meanings. In the English language, for example, it is common to have concepts having a very similar meaning. For instance, the lemma "Fan" can having the following similar meanings, which can be represented by the following three synsets 202:

---

{fan / devotee / lover / etc.} an ardent follower;
{fan / sports enthusiast / sports fan};
{fan / fanatic} somebody who is very enthusiastic about a pastime or hobby.

---

These three slightly different meanings of the lemma "fan" express the same concept of "passionate person, in love with something". In order to maximize its capability to understand also the nuances of the English language, the semantic network 12 contains all the three different synsets 202. However, the three different synsets 202 are linked through the semantic relationship of similarity using the fine grain/coarsed grain link. In this kind of semantic relationship the most common meaning is the father while the less common meanings are the sons. Other Examples: 1) Flowers and plants—The synset "flower" is the father and the synset "plant" is the son. 2) Animal and animal considered as food—The "living animal" synsets are the father and the "animal/food" synsets are the sons.

Categories

Much information is needed to disambiguate a synset 202, to identify and to distinguish the different senses of the same lemma 200. Often, synonymy is not sufficient to disambiguate a synset 202, and synsets 202 are not sufficiently informative because synsets 202 are often made up of only one lemma 200 (i.e., no synonyms). Therefore, the exemplary embodiment provides the semantic network 12 with non-lemma elements to enable the linguistic processor 16 to identify and possibly assign non-ambiguous senses to lemmas 200 found in input text 18.

According to the one embodiment, an additional element added to the semantic network 12 is the organization of the synsets 202 into a hierarchy of categories. Categorization is the process through which entities of the external world are grouped into categories or classes according to similarities or differences observed among them. Categories can be thought of as an expression conceptually the external world is linguistically organized.

Figure 5:
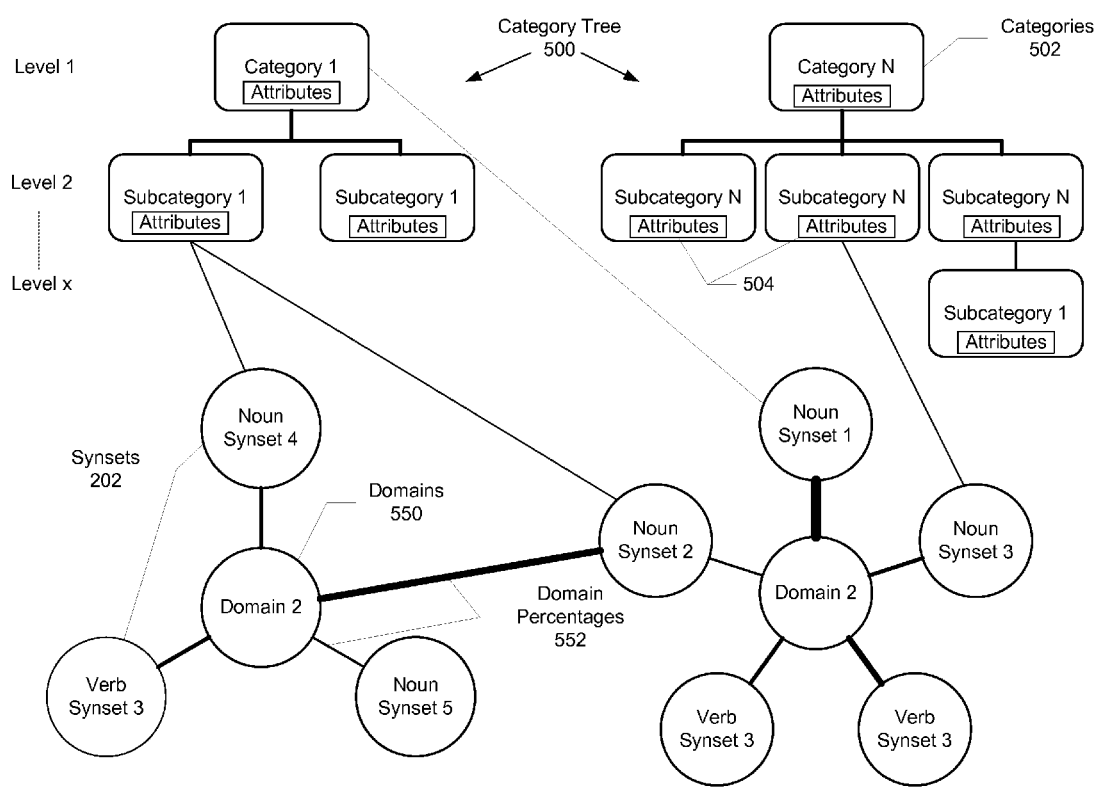
FIG. 5 is a diagram graphically illustrating synset categories of the semantic network.

FIG. 5 is a diagram graphically illustrating synset categories of the semantic network 12. According to the exemplary embodiment, the semantic network 12 organizes the synsets 202 into a hierarchical tree 500 of categories 502. Each category 502 contains a group of one or more synsets 202 and a set of attributes 504 that are associated with each of the synsets 202 in that category 502. In one embodiment, each category 502 has all the attributes 504 of the immediately higher category (father), plus one or more specific distinctive attribute. Any category 502 that is a son of a father category can be considered a subcategory. Thus, all categories 502 except those on the top level of the tree 502 can be a subcategory. A synset 202 may belong to more than one category 500 and thus share all the attributes 504 related to those categories 500. It is important to assign the synsets 202 to different categories 502, which have different attributes 504, to avoid losing information that is important for the disambiguation.

In one embodiment, the categories 502 may be limited to only noun-type synsets 202, but nothing prevents other types of synsets 202 being included in the category tree 500, or the creation of different category trees 500 for different types of synsets 202.

The tree 500 includes a top-level made up of the most abstract, general and, for this reason, inclusive categories 502, and each category may include other sub-categories. Bottom-level categories 502 represent unique models. In one exemplary embodiment, where the English language is represented, the category tree 500 includes eleven top-level categories 502. According to this exemplary embodiment, the eleven top-level categories 502 include: Objects, Animals, Plants, People, Concepts, Places, Time, Natural Phenomena, States, Quantity, and Groups. These top-level categories 502 are the most abstract categories with no "father".

There are many ways of categorizing synsets/lemmas of a language according to chosen criteria such, as form, function, and use for instance. For example, animals and plants can be classified in many different ways according to their shape, their place of origin, their type of reproduction, and so on. According to one exemplary embodiment, the method chosen to categorize the semantic network 12 is intuitive, based on the experience of the linguists, rather than to a strictly scientific method. The top-level categories 502 should be carefully defined to ensure a minimum number, subject to the requirements of identifying groups of noun synset 202 sharing the same attributes.

To give an example of the process used to create the category tree 500, consider the top-level category "natural phenomena." In general, this category contains synsets 202 having abstract lemmas 200 (e.g., "earthquake", "hurricane", "wind".) The synsets 202 containing these lemmas 200 could also be placed inside the category "Concepts." However, when these lemmas 200 are considered in relation to verbs, such as subjects or direct objects of transitive verbs, they behave in similar way of the lemmas 200 belonging to the category "objects" (for example: "the hurricane destroyed the island").

The same subjective, effectiveness driven logic used in identifying the top-level categories 502, may be used to choose the attributes 504 assigned to each category 502 and to create the lower-level categories 502. For example: "category objects" may have as a first hyponymy level "category natural objects", "category substances", "category food", "category parts", etc., that are all co-hyponyms of "category objects". Each of these categories may then be further split into lower-level subcategories, and so on.

Domains

Another element added to the semantic network 12 that differentiates the semantic network 12 from conventional semantic nets is the association of a set of one or more domains with the synsets 202. Domains are used to define specific linguistic context in which a synset 202 (noun, verb, or adjective) is used in a language to help the linguistic processor 16 to understand the meaning of the synsets 202. The domains are used to distinguish and disambiguate the meaning of a synset 202 from other synsets 202 containing the same or common lemma(s) 200.

FIG. 5 also graphically illustrates the use of domains in the semantic network 12. The semantic network 12 includes a plurality of domains 550, each of which is a word that generally indicates a linguistic context in which an associated synset 202 is used in a particular language, e.g., English. Example domains 550 may include words such as, clothing, acoustics, agriculture, food, breeding, anatomy, art, martial arts, insurance, astrophysics, astrology, and so on.

In an exemplary embodiment, the domains 550 may be organized in a hierarchy of three levels, as the following example illustrates:

breeding
craftwork
  artistic handicraft
    pottery
    glass painting
  carpentry
mountaineering
  free climbing
  downhill skiing Each synset 202 may be associated with one or more domains 550. In one embodiment, each synset 202 may only be associated with at most two domains 550, i.e., each synset 202 can be assigned to 0, 1, or 2 domains 550.

For each association between one of the domains 550 and one of the synsets 202, a weight referred to as a domain percentage 552 is assigned to indicate how frequently the meaning related to the synset 202 is used in the context of the associated domain 550 (high frequency) versus use of synset's meaning in common general language (low frequency). Thus, the domain percentage 552 represents the frequency of the utilization of the meaning of a synset 202 when used in a specific context.

In one embodiment, the domain percentages 552 are represented as a percentage value from 0% to 100%. A low percentage, e.g., 10%-20%, may be used to indicate meanings of synsets 202 that are used in common everyday language and not specific to a single context represented by the associated domain 550. A high percentage, e.g., 80%-100%, may be used to indicate meanings of synsets 202 that are used in a specific context represented by the associated domain 550. In FIG. 5, domain percentages 552 between synsets 202 and domains 550 that have low percentage values are depicted as thin lines, while domain percentages 552 having high percentage values are depicted as thick lines. In an alternative embodiment, rather than percentages, the domain percentages 552 can be represented as simple weight values.

As an example of domain percentages 552, assume "gymnosperm" belongs to a particular synset, and that the synset is associated with the domain of "botany". Because gymnosperm is a term of botanical taxonomy that is practically never used in everyday language, a very high domain percentage (e.g., 100%) is assigned since the term "gymnosperm" is used mainly in the context of the domain of "botany". However, the son of the synset "botany", the synset "conifer", is also a technical term, but it is more commonly used in everyday language. Therefore, a lower domain percentage (e.g., 30%) is assigned in the association of synset "conifer" with the domain "botany". Other sons of the synset "botany", such as "pine" and "fir", in contrast, are very common lemmas", and therefore a very low domain percentages (e.g., 10%) are assigned in their association to the domain "botany". Continuing with this example, consider the following sentences, in which the less commonly used lemma is enclosed in brackets. The less commonly used lemma has a higher domain percentage 552 in terms of association with the specific domain botany:

"For Christmas, I decked the pine tree [gymnosperms] of my garden with colored lights".

"Vitamin A [Axerophtol] is good for your sight".

As another example, consider the lemma/synset "cat" in its meaning "animal". It scores low in its association to the domain "zoology" because it is used not only in the zoological taxonomy (in technical zoological and veterinary manuals), but it often is used in contexts that do not have anything to do with zoology and veterinary science (e.g., "My cat ran away"; "My neighbor has ten cats"; "Cats and dogs are often abandoned by their owners in summer time"; etc.).

As stated above, in one embodiment of the semantic network 12, some domains 550 may have a hierarchy in which the domains 550 are linked to each other in a father/son relationship. For example, consider the following father/son domains: sport >football, tennis, skiing, etc.; and medicine (as medical science)>cardiology, orthopedics, and so on. It is preferable to assign the most possible precise and specific domain to the synsets 202. For example, consider the synset "giant slalom". Valid domain 550 assignments could be both "sport" and "skiing". The most correct one for effective semantic disambiguation is "skiing" because it is more specific than "sport".

For an example of how domains 550 are used to distinguish and disambiguate the meaning of a synset 202 from other synsets 202 containing the same lemma(s) 200, consider a phrase containing the noun "quarterback", which in English is a monosemic word (has only one meaning) and it is used basically only in the "football" domain. During disambiguation of text 18, the linguistic processor 16 stores this information in memory and when linguistic processor 16 finds in the text 18 the word "interception" or "return", for example, the linguistic processor 16 can determine with a high probability that the meaning of the phrase has to be related to football and therefore assigns a high weight in the disambiguation process to this possible meaning.

Attributes at the Synset and Lemma Levels.

Another element characterizing the improvement of the synset 202 over prior art is the association of two different sets of additional attributes 708 at the synset 202 and at the lemma 200 level. The purpose of the set of attributes 708 associated with the synsets 202 is to limit situations in which one of the synsets 202 is linked to multiple category chains, which results in a significant improvement in the efficiency and speed of the deep linguistic analysis performed by the system 10.

A different set of attributes 708 are associated with synsets 202 depending on the grammar type of the synset 202, i.e., whether the synset 202 is a noun, a verb or an adjective.

Attributes of Noun Synsets

According to one embodiment, the set of attributes that may be associated with a noun synset 202 are: Place, Time, Solid, Liquid, and Gas.

The attribute "Place" may be used for a synset 202 identifying: geographical places ("mountain", "sea"); real places ("square", "park", etc.); closed spaces where it is possible to perform an activity ("pub", "school", "movie theater", "apartment"); means of transport ("airplane", "vehicle", "ship", etc.); and mental places ("hell", "heaven", etc.).

The attribute "Time" may be used for a synset 202 indicating: a period of time ("age", "winter", "Cretaceous period", "Algonkian"); days of the week; months; and seasons (also with a figurative meaning "football season").

The attribute "Solid" may be used for a synset 202 identifying: solid objects ("building", "dress", "stone", "snow"); people and groups of people ("monk", "child", "crowd", "court"); animals and groups of animals ("ant", "elephant", "herd"); and plants and groups of plants ("orchid", "birch", "forest", "jungle").

The attribute "Liquid" may be used a synset 202 identifying liquids ("drink", "beer", "infusion"); and natural liquid objects ("watercourse", "sea", "lava flow").

The attribute "Gas" may be used for a synset identifying gases ("gas", "steam", and so on).

To explain how an individual synset attribute is set when added to the semantic network 12, consider the synset "square". "Square" is a location and an architectural element, thus it can be associated with the attributes solid and place. In ambiguous cases like this one, the system 10 examines the hypernym in the category tree 500: if the top hypernym is "category objects", then the attribute for the synset "square" will be automatically set to "solid". For synsets 202 having a "category objects" as a hypernym, which at the same time are also places or liquids, the synset 202 specific attributes place/liquid help to avoid a double link to these other categories. In the example above with the synset "square", the creation of a link to both "category objects" and "category real places" is avoided. The hypernym chain will end with "category objects" and the individual synset attribute will show that the synset "square" is also a place.

Attributes of Verb Synsets

According to one embodiment, the set of attributes that may be assigned to a verb synset 202 are: a Grammar Type, a List of Likely Subject(s), and a List of Likely Direct Object(s). The grammar types that can be associated with a verb synset includes transitive, intransitive, pronominal, intransitive, reflexive, impersonal, reciprocal reflexive, active copulative, and passive copulative. The list of likely subjects indicates a belonging category for nouns that can be the subject of verb synset. It is also possible to associate one or more specific synsets and their hyponyms to indicate a specific subject of the verb.

Among the list of likely subjects there is also a verb attribute, which is used to indicate that the verb synset can have a verb, an entire sentence, or a subjective clause (e.g., "it seems") as a subject. For example:

"To bark" has as subject "category animals", "category group of animals" and "dog".

"To bark" (with figurative meaning) has as subject "category people" and "category group of people".

"To operate" has as subject "category people" and "category group of people".

The list of likely direct object(s) includes all the elements described for subjects. However, an indirect object can also be specified whether the indirect object is a thing, an animal, a person, a concept, or a place.

Attributes of Adjective Synsets

According to one embodiment, the set of attributes that may be assigned to an adjective-type synsets 202 are: Precedes Noun; Degree; Connotation; Relationship Synset/Lemma; and Class. The attribute "Precedes Noun" is used to indicate whether or not the adjective typically precedes a noun.

The attribute Degree is used to indicate a characteristic of quantitative type and may be assigned the following values: much/very, not much/not very, and neutral. The attribute degree is used only for adjectives indicating measure, quantity, and so on, and also the intensity of the characteristic expressed by the adjective ("brutal" means very mean). Examples of adjectives and corresponding attribute degree values are listed below:

| | |
|---|---|
| "Abundant" | much/very |
| "Scarce" | not much/not very |
| "Brutal" | much/very |
| "White" | neutral |

The attribute Connotation is used to indicate whether the adjective connotation is positive, negative or neutral and may be assigned the following values: negative, partially negative, neutral, positive, and partially negative. Examples of adjectives and corresponding assigned connotations are listed below:

| | |
|---|---|
| "Good" | positive |
| "Cruel" | very negative |
| "Heinous" | very negative |
| "Beautiful" | positive |
| "Excellent" | very positive |
| "Ancient" | neutral |

The attribute Relationship is used to list the synset and/or lemmas of the noun(s) the adjectives stem from, with which they have the structure in common (e.g., good/goodness, beautiful/beauty, cruel/cruelty, etc.). The Relationship attribute may be implemented using two fields; Relationship Synset and Relationship Lemma, each of which lists the synsets and/or lemmas of the noun(s) the adjective stems from. Adjectives are not always related to synsets and lemmas; for example, the adjective "martial". In these cases the fields Relationship Synset and Relationship Lemma remain empty.

The attribute Class shows the noun the adjective is associated with and generally indicates the semantic sphere the noun related to the adjective of the considered synset belongs to by listing the categories associated with the noun. For example:

"Alkalic, alkaline": "category substances", "category solids", "category liquids"+chemistry (e.g. alkaline reaction).

"Botanical": "category people", "category places", "category activities", "written texts", "category processes", "category knowledge", "category states"+botany (e.g. botanical garden).

The Class is represented by single synsets or by the noun domain the adjective is related to in case of more sectorial and specific terms (in the examples above, chemistry and botany). For example, consider the adjective "good" (=valuable, useful, having desirable or positive qualities especially those suitable for a thing specified). It precedes the noun it refers to. It is not quantitatively characterized, therefore the field is neutral; the connotation is positive; it is linked to the lemma "good, goodness"; the class may include "category people", "category group of people", "category activities", "category actions", "category emotions", "facts", "category communications", "written text", "category processes", "category states" and in addition [ethics] that is the more likely domain for nouns associated with the adjective "good".

Figure 6:
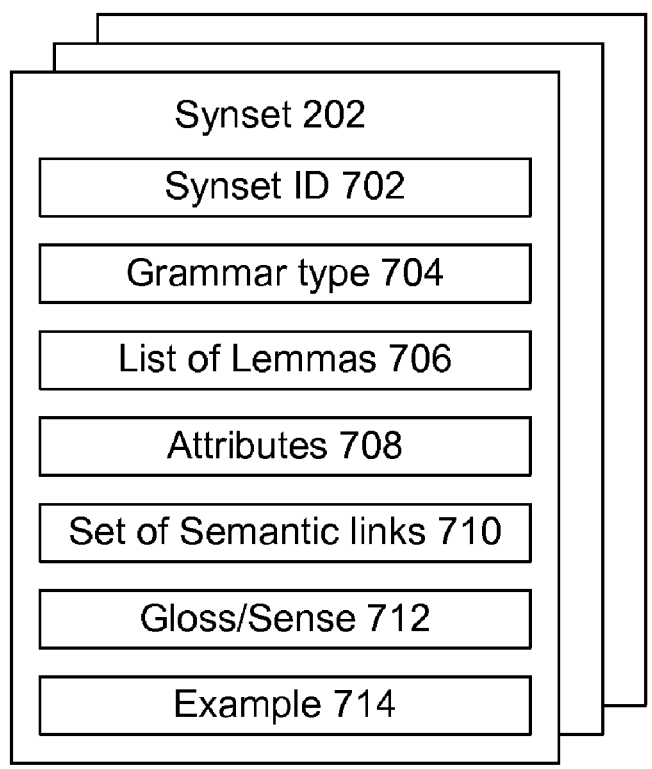
FIG. 6 is a diagram illustrating the implementation of lemmas and synsets in the semantic network according to an exemplary embodiment.
Figure 6:
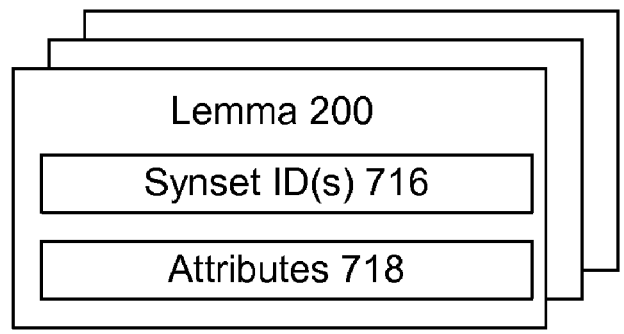

FIG. 6 is a diagram illustrating the implementation of lemmas and synsets in the semantic network 12 according to an exemplary embodiment. The synsets 202 may be stored in a table and defined by the following fields: a synset ID 702, a grammar type 704, a list of lemmas (O-M) 706, the set of attributes 708, a set of semantic links 710, a gloss/sense 712, and an example 714.

The synset ID 702 identifies each of the synset 202. The grammar type 704 specifies the grammar type of the synset 202, i.e., noun, verb, adjective, adverb, proper noun). The list of lemmas 706 specifies the lemmas 202 belonging to the synset 202. In one embodiment, the list of lemmas 706 includes word lemmas 200 as well as compound words, collocations, and idiomatic expressions. In another embodiment, the synset 202 may contain respective fields for listing compound words (0-M), collocations (0-L), and idiomatic expressions (0-Q).

As described above, the set of attributes 708 contained in the synset 202 are different depending on the specified grammar type 704 of the synset 202. The set of semantic links 710 is a listing of the semantic links between the synset 202 and other synsets. The number and configuration of the semantic links is different depending on the type of semantic relation between the synsets (e.g., hypernym, hyponym). At a minimum, each semantic link should indicate the type of semantic relation and identify the corresponding synset.

The gloss/sense 712 contains a text representation of the meaning component of the concept expressed by the synset 202, and the example 714 contains a text representation of an example use of the synset 202. It should be noted that in one embodiment, the glosses/senses 712 and the examples 714 are included to help linguists input data to build the semantic network 12, but the linguistic processor 16 does not recognize the glosses/senses 712 and the examples 714 since they are made up of text parts and are not useful in distinguishing one synset from another.

In addition to the attributes 708 that apply to the entire synset 202 and to each lemma 200 in the synset 202, according to the exemplary embodiment, another series of attributes is provided relative to single lemmas 200.

Referring still to FIG. 6, each lemma 200 in the semantic network 12 includes a list of synset IDs 716 and lemma attributes 718. Each lemma 20 can be included in more than one synset 202, and the synset IDs 716 specify the synsets 202 to which the lemma is linked.

The set of lemma attributes 718 assigned to lemmas 200 is different from the attributes 708 belonging to synsets 202, and are also an important element for the semantic disambiguation. The lemma attributes 718 may include:

A GRAM specifying gender, number and Inflexions,
Frequency, and
Register.

The GRAM attribute contains two fields for specifying the number (singular/plural) and inflexions for each lemma 200. The information entered in the GRAM fields is valid for the same lemma 200 in all the synsets 202 that contain it. If a lemma 200 with a particular meaning has characteristics different from the general rule, it is necessary to specify these grammar characteristics by using these attributes.

The frequency attribute and register attribute further qualifies a specific lemma 200 to make the semantic disambiguation analysis performed by the linguistic processor 16 more precise.

The register attribute is a list of words specifying expressive meaning of a lemma 200. A lemma 200 may have one or more registers. In an exemplary embodiment, the list of the registers used in the semantic network 12 may include the following types expressive meanings of a lemma 200 followed by example uses in parenthesis:

| | |
|---|---|
| Figurative | (fox: that man is a sly old fox) |
| Dialectal | (me mum, instead of "my mother") |
| Slang | (gourd instead of head) |
| Colloquial | (telly instead of television) |
| Foreign | (pasta) |
| Ironic | (concert: a noisy disturbance; loser cruiser: a public transportation vehicle used by people without personal vehicles |
| Obsolete | (thou) |
| Regional | (ta: thank you in the London area) |
| Vulgar | (sap as an insult) |
| Informal | (pussycat) |
| Literary | (also for poetical terms; eek/eke (Old English): to increase) |
| Culturebound | (posse: in the U.S. is a team of searchers) |
| Latinism | (referendum) |
| Euphemism | (eternal rest) |
| Hyperbolic use | (million: meaning a large indefinite amount) |
| Abbreviation | (Inc.) |
| Adaptation | (salami, singular form) |
| Incorrect | (craker instead of cracker) |
| Uncommon | (for uncommon lemmas that are rarely used: licentious life) |

A lemma 200 has as many synsets 202 as it has definitions (one for each, separate meanings). The last lemma attribute 718, frequency, stores a value used to rank frequency of use of all the synset meanings that a lemma has. In an exemplary embodiment, the frequency value assigned to each lemma 200 in the semantic network 12 is a relative frequency. Thus, the frequency value assigned is calculated in relation to the various synsets 202 that a lemma 200 may have, rather than in relation to the frequency of use of the synonyms contained in one synset 202. The value assigned to the frequency depends solely upon the quantity of meanings/synsets a lemma 200 has and the actual usage of those meanings in the particular language.

In one embodiment, the frequency value that can be assigned a lemma 200 is a number from 1 to 100, where 1 is the highest frequency and 100 is the lowest frequency (although the number could be reversed). High frequencies are assigned to lemma meanings/synsets that are very common and frequently used in a language. Therefore, these meanings represent the main and most general definitions of a given lemma 200. For example, consider the following lemmas "chicken" and "mouse. The main definitions of "chicken" are a foodstuff, and a bird. The main definitions of "mouse" are a small rodent, and an input device for a computer. Such meanings would be assigned a value representing high frequency.

Low frequencies are assigned to the more specific, technical, rare, formal, regional, dated or obsolete forms of a lemma 200. These values are determined by how often the lemma 200 is used in everyday, modern language. Therefore, meanings/synsets with lower frequencies can be considered less common and less frequent. For example, the less common definitions of "chicken" are: a cowardly person (figurative), a competition (informal), a young woman (rare). The less common definitions of "mouse" are: a timid person (figurative), a dark swelling under the eye (slang/obsolete). Such meanings would be assigned a value representing low frequency.

To determine which frequency value to assign to a particular lemma 200, an assessment is made of the lemma's frequency within the language in respect to the other synsets 202 of the same lemma 200. In other words, the various meanings of a lemma 200 are ordered based on their relativity. Often, many meanings that are well known by all English speakers are not actually considered "frequent" because they are used only in certain contexts or in very few expressions (such as figures of language, rhetorical expressions and idiomatic expressions). Therefore, if a certain meaning of a word is well known and/or common, it is not necessarily considered frequent.

To help decide which frequency value to assign, the exemplary embodiment provided three main frequency groups, GROUPS 1-3. GROUP 1 is the first group and includes the most common and principal meanings of a lemma 200. The frequency values assigned to this group are normally from 1 to 5. This group can contain meanings that are very general. Lemmas 200 such as "ball" and "cross" are examples of common English lemmas which each have many meanings, including one which is the most general: ball as any object with a spherical shape; and cross as two straight lines that bisect each other.

Group 1 should also include all frequently used meanings that can normally be found in a newspaper or non-technical text. These can also be lemmas that may have a specific domain assigned to them, but that have entered into common use: for example "stock" is a term which pertains specifically to the stock market, but it is also commonly used in the English language.

Group 1 can contain some meanings that are common, but are usually found only in few, fixed expressions. These meanings are assigned to Group 2 and are completed with links in order to tie them to the specific expressions in which they commonly occur. In this same group we can also find the figurative senses of lemmas such as: chicken, doll, dog. In the figurative sense, these lemmas imply a person and are used in sentences such as: "Don't be a chicken!", "Melissa is a doll" and "Her husband is such a dog!".

GROUP 2 includes meanings that are well known, but are understood only when found in certain contexts or settings. For example house meaning a zodiacal sign, or house meaning a legislative assembly. The values assigned to this group should be: at least +5 of the last frequency of the preceding group.

GROUP 3 includes meanings that are very specific and can be further divided into 2 subcategories. Group 3A contains trade-related and technical meanings that are heavily characterized by specific dominions (a high dominion percentage) and are frequently used in these domains. An example is the very common lemma "bag". The meanings of "bag" which are assigned to Group 3A are:

A place that a runner must touch before scoring (pertains to the domain of baseball)

Mammary gland of bovines (pertains to the domain of zoology)

The quantity of game hunted (pertains to the domain of hunting)

Often, in this group, it is difficult to decide the ranking order of the frequencies; therefore, the same frequency value can be assigned to all of these meanings (a future assignment will be to control the real use of these meanings and rank them accordingly). These meanings will also be enriched with contextual links such as: prepositions, subject and direct objects (in order to give more weight to the specifying domain as well as to differentiate it from the other meanings). In one embodiment, the frequency of group 3A should be contained between 30 and 40. A frequency of 40 should be assigned to meanings that tend to be related to the more obscure domains (e.g.: biochemistry, genetics). The values for this sub-category must be at least +5 of the last frequency in Group 2.

Group 3B includes meanings that are obsolete, literary, regional, obscure or obsolete—meanings that are extremely rare in the English language. An example is the very common lemma "host". The meanings of "host" which are assigned to Group 3B are:

A group of angels (literary)

An army (obsolete)

In one embodiment, the frequency values of group 3B should be between 60 (rare, literary) and 80 (archaic, obsolete), and the values for this sub-category should be at least +15 of the last frequency in group 3A.

Figure 7A:
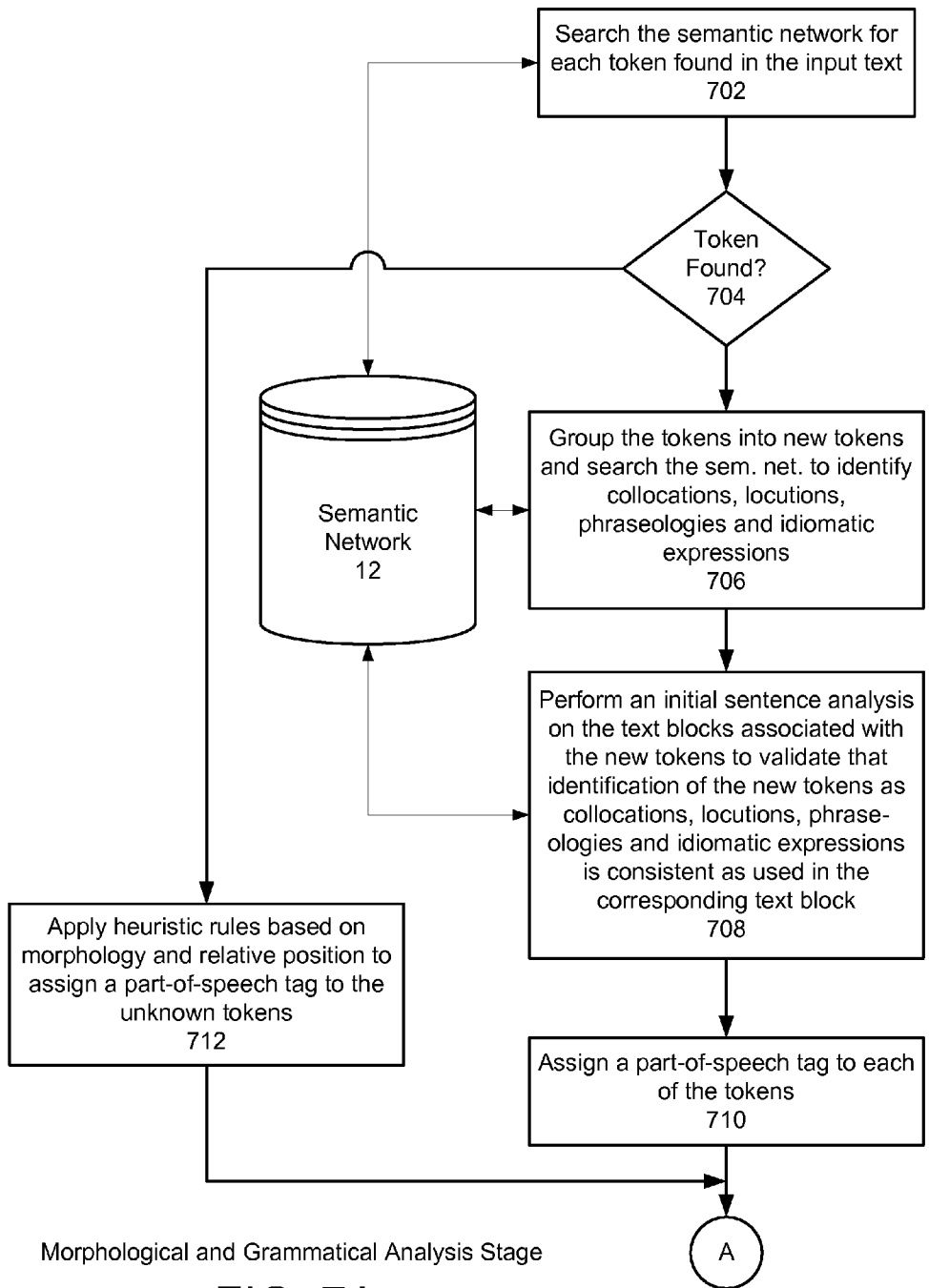
FIGS. 7A and 7B are diagrams illustrating in further detail the process performed by the morphological and grammatical analysis stage according to an exemplary embodiment.
Figure 7B:
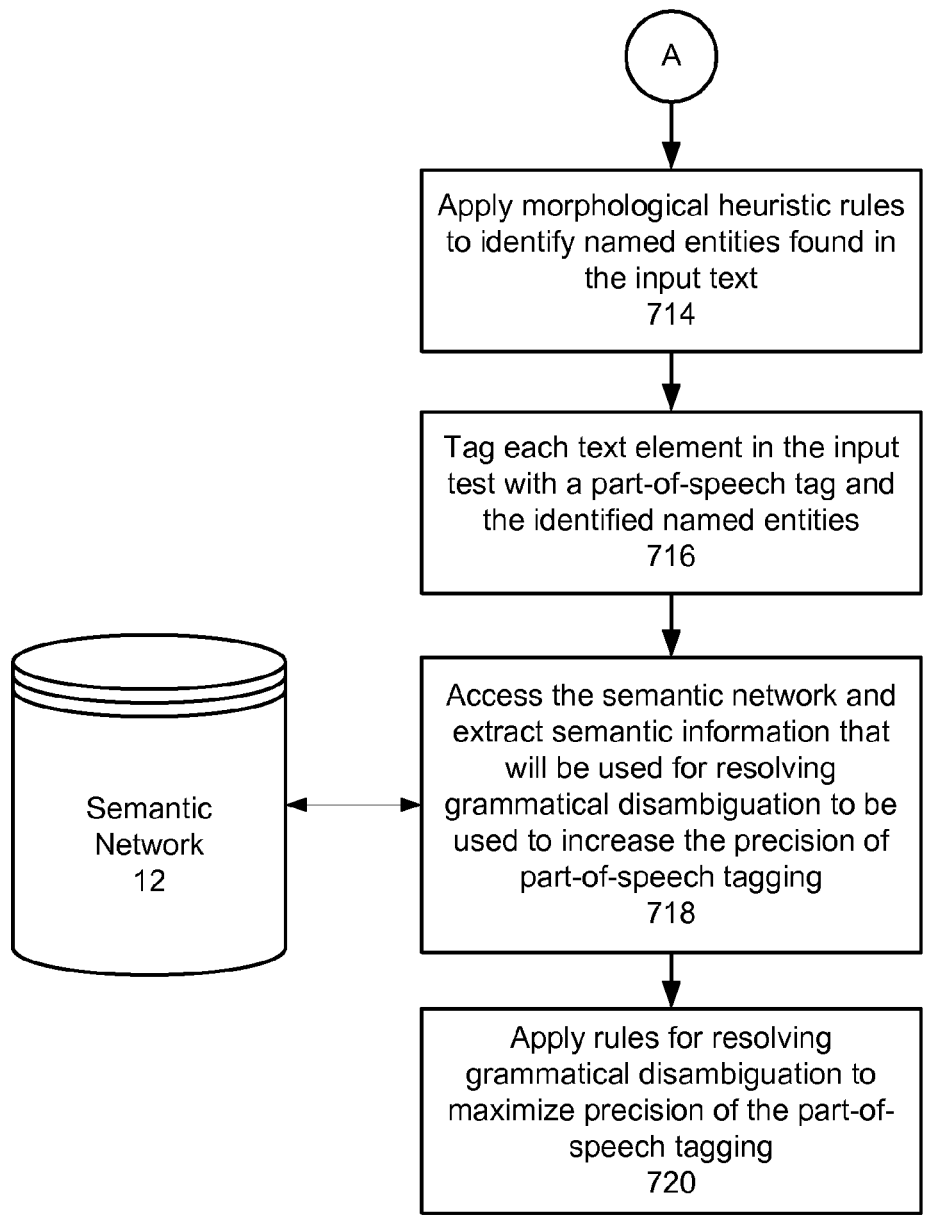

FIGS. 7A and 7B are diagrams illustrating in further detail the process performed by the morphological and grammatical analysis stage 24 according to an exemplary embodiment. As stated above, the morphological and grammatical analysis stage 24 uses both information available in the semantic network 12 and grammatical disambiguation rules 36 to perform grammatical disambiguation. According to the exemplary embodiment, part-oh-speech tags are assigned to tokens from the input text based in part on an initial sentence analysis.

The process begins by the linguistic processor 16 using each token identified during the token next traction stage 22 to search the semantic network 12 for a matching lemma (block 702). For the tokens determined to be present in the semantic network 12, i.e., that have a matching lemma (block 704), the linguistic processor 16 then groups adjacent tokens from the input text 18, creating new tokens, and searches the semantic network for the new tokens to identify potential collocations (i.e., the association between two words that are typically or frequently used together), locutions (a phrase or expression typically used by a group of people), phraseologies (phrases used in a particular sphere of activity) and idiomatic expressions (characteristic of, or in keeping with, the way a language is ordinarily and naturally used by its native speakers) (block 706). For example, given the words "credit card" in the input text 18, the semantic processor 16 first searches for the word "credit" in the semantic network 12, and then searches for the sequence of words, "credit card". The text blocks from the input text 18 associated with the new tokens is also identified.

The linguistic processor 16 then accesses the semantic network 12 and performs an initial and fast sentence analysis on the text blocks associated with the new tokens to validate that identification of the new tokens as collocations, locutions, phraseologies or idiomatic expressions is consistent with their relationships to related words in the corresponding text block (block 708). More specifically, each token (including a token comprising groups of words) has a corresponding lemma 200 in the semantic network 12, and each lemma 200 can belong to more than one synset 202, each of which has one associated meaning or sense. By finding all the synsets 200 to which the matching lemma belongs, all possible meanings, grammatical attributes, and so on, can be identified for the token. Performing an initial sentence analysis in the text blocks to verify identification of collocations etc., is in contrast to traditional systems in which identification of words as collocations is performed by a simple table lookup without regard to surrounding text.

For each of the identified tokens in the input text, the linguistic processor 16 also assigns a part-of-speech tag to the tokens, e.g., noun, verb, adverb, and so on (block 710). For the tokens determined not to be present in the semantic network 12, i.e., unknown tokens (block 712), the linguistic processor 16 applies heuristic rules based on morphology and relative position to assign a part-of-speech tag to the unknown tokens. The following is an example of a heuristic rule to identify unknown elements by assigning part-of-speech tags:

if the unknown term is before an adjective or a verb and ends with "ly" the term is (could be) an adjective;

if the unknown term is before a verb and the verb accepts as subject animals, the term is a proper noun The linguistic processor 16 applies the morphological heuristic rules to identify named entities, such as people, locations, dates, and so on, found in the input text 18 (block 714). Each text token in the text 18 is then tagged with acceptable part-of-speech tag and the identified named entities (block 716). The linguistic processor 16 then accesses the semantic network 12 and extracts semantic information that will be used for resolving grammatical disambiguation to be used to increase the precision of part-of-speech tagging (block 718). As described above, each token is used to query the semantic network 12 to retrieve the meanings and other grammatical items associated with each synset 200 to which the matching lemma belongs and the attributes associated with the matching lemma.

The grammatical disambiguation rules 36 for resolving grammatical disambiguation are then applied to maximize precision of the part-of-speech tagging (block 720). An example of such a rule is the following: "if an article is positioned before an element that has two feasible part-of-speech types, and if the two types are noun and verb, then tag the element as a noun."

Figure 8:
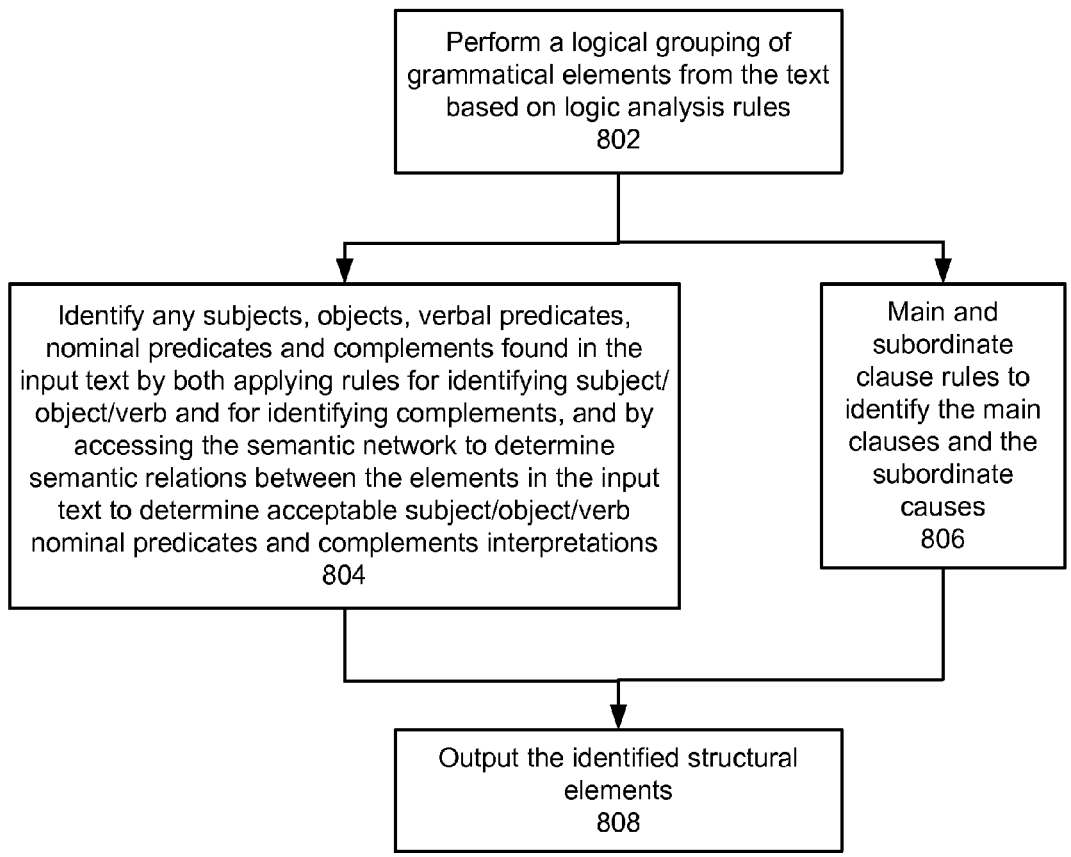
FIG. 8 is a diagram illustrating in further detail the process performed during the sentence analysis stage in accordance with an exemplary embodiment.

FIG. 8 is a diagram illustrating in further detail the process performed during the sentence analysis stage 26 in accordance with an exemplary embodiment. As stated above, the sentence analysis stage 26 uses information in the semantic network 12 and language-specific logic analysis rules 38 to identify structural elements of each sentence, including subject/object/verb, complements, and main and subordinate clauses, and outputs the resulting structural elements. The process begins by the linguistic processor 16 performing a logical grouping of grammatical elements from the text 18 based on the logic analysis rules 38 (Block 802). For example, assume the input text 18 includes the phrase "my old car needs to be fixed." The elements "my" "old" "car" would be grouped together in the noun phrase "my old car", while "needs" and "to be fixed" would be grouped into two verbal phrases.

The linguistic processor 16 then identifies any subjects, objects, verbal predicates, nominal predicates and complements found in the input text 18 by both applying rules for identifying subject/object/verb and for identifying complements (i.e., part of logic analysis rules 38), and by accessing the semantic network 12 to determine semantic relations between the elements in the input text 18 to determine acceptable subject/object/verb nominal predicates and complements interpretations (block 804). For an example of the rules for identifying subject/object/verb and rules for identifying complements, consider application of the rules to the input phrase "My roadster eats more gas":

Step 1: start from the verb to "eat".

Step 2: if the word before "eat" is a noun, then determine if the word before "eat" could be a subject.

Step 3: access the verb "eat" in the semantic network 12, examine the subject/verb semantic links in both the synsets 202 containing the verb "eat" and in the synsets 202 contained in categories 502 that are fathers of the categories 502 containing roadster to determine a subject/verb relationship is acceptable between the subject "roadster" (i.e., its father categories 502) and the verb "eat.

Step 4: if the pair is acceptable, then look at the word after "eat".

Step 5: if the verb "eat" is transitive and the word after "eat" is a noun, then determine word after "eat" could be a direct object.

Step 6: access the verb to "eat" in the semantic network 12 and examine the verb/object semantic links in synsets 202 containing the verb "eat". If a link is found between a synset 202 containing the verb "eat" and a synset 202 containing the noun "gas", then identify "gas" as a direct object.

The result of the this step is that the noun phrase "my roadster" is assigned the role of subject, "eats" is identified as the verbal predicate, and the noun phrase "more gas" is identified as the object complement.

The linguistic processor 16 uses the semantic network 12 and the main and subordinate clause rules to identify the main clauses and the subordinate causes (block 806). The following is an example of the main and subordinate clause rules:

A clause is a grammatical unit that includes at minimum, a predicate and an explicit or implied subject, and expresses a proposition. The clause can be main or subordinate.

If the clause is introduced by a conjunction, a relative pronoun etc., or it contains and infinite verb etc., then it is a subordinate clause.

For example, in the input phrase "The sandwich that John gave to me was very tasty", the second clause "that John gave to me" starts with a relative noun, and is therefore a subordinate clause.

In one embodiment, the different kinds of logic analysis rules 38 (subject/object/verb and complements rules, and main and secondary clause rules) may be applied in parallel utilizing an algorithm for linear optimization to ensure the best overall quality of the outcome of the analysis. The output of the process is the resulting identified structural elements (block 808).

Figure 9A:
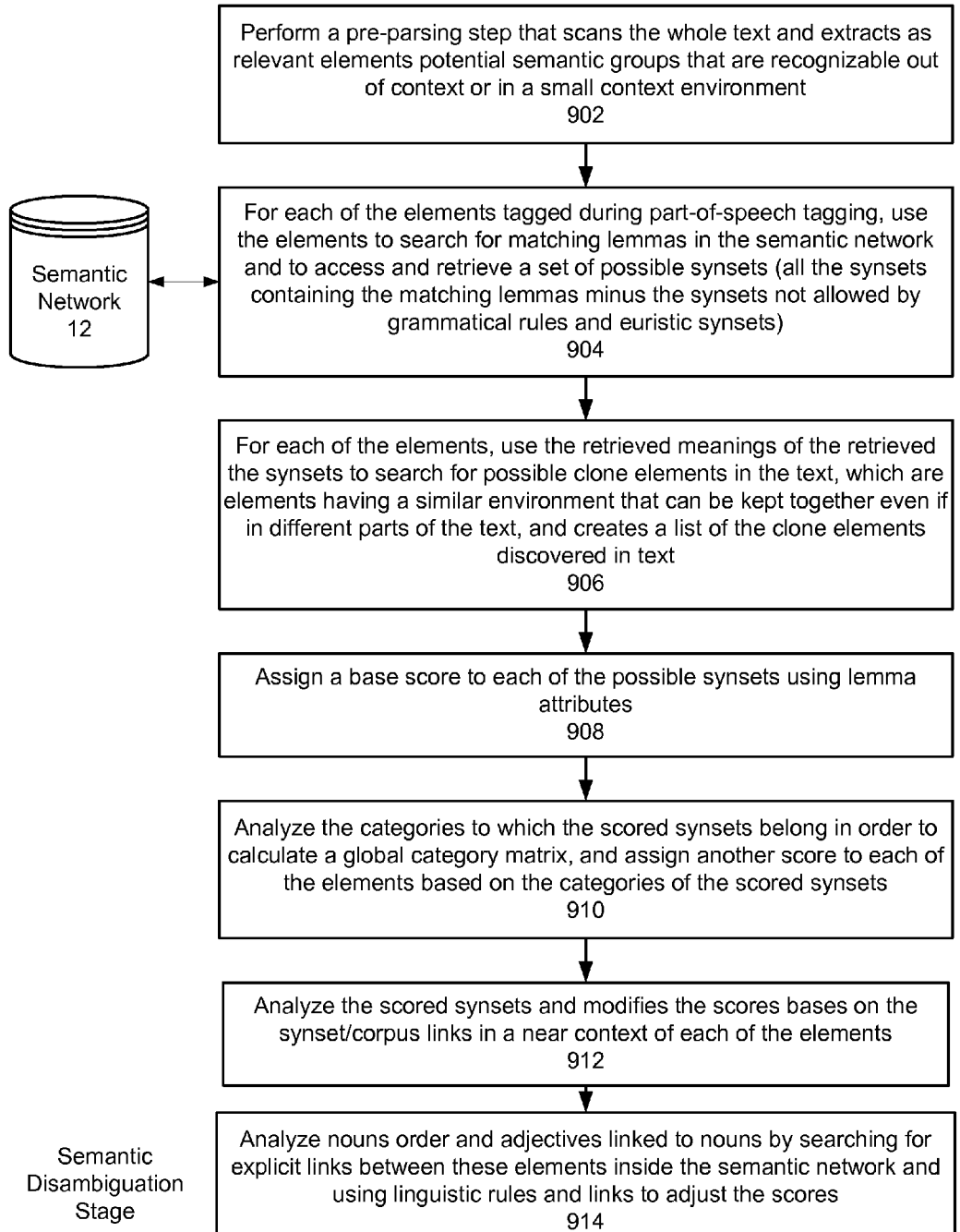
FIGS. 9A and 9B are block diagrams illustrating in further detail the process performed during the semantic disambiguation stage in accordance with an exemplary embodiment.
Figure 9B:
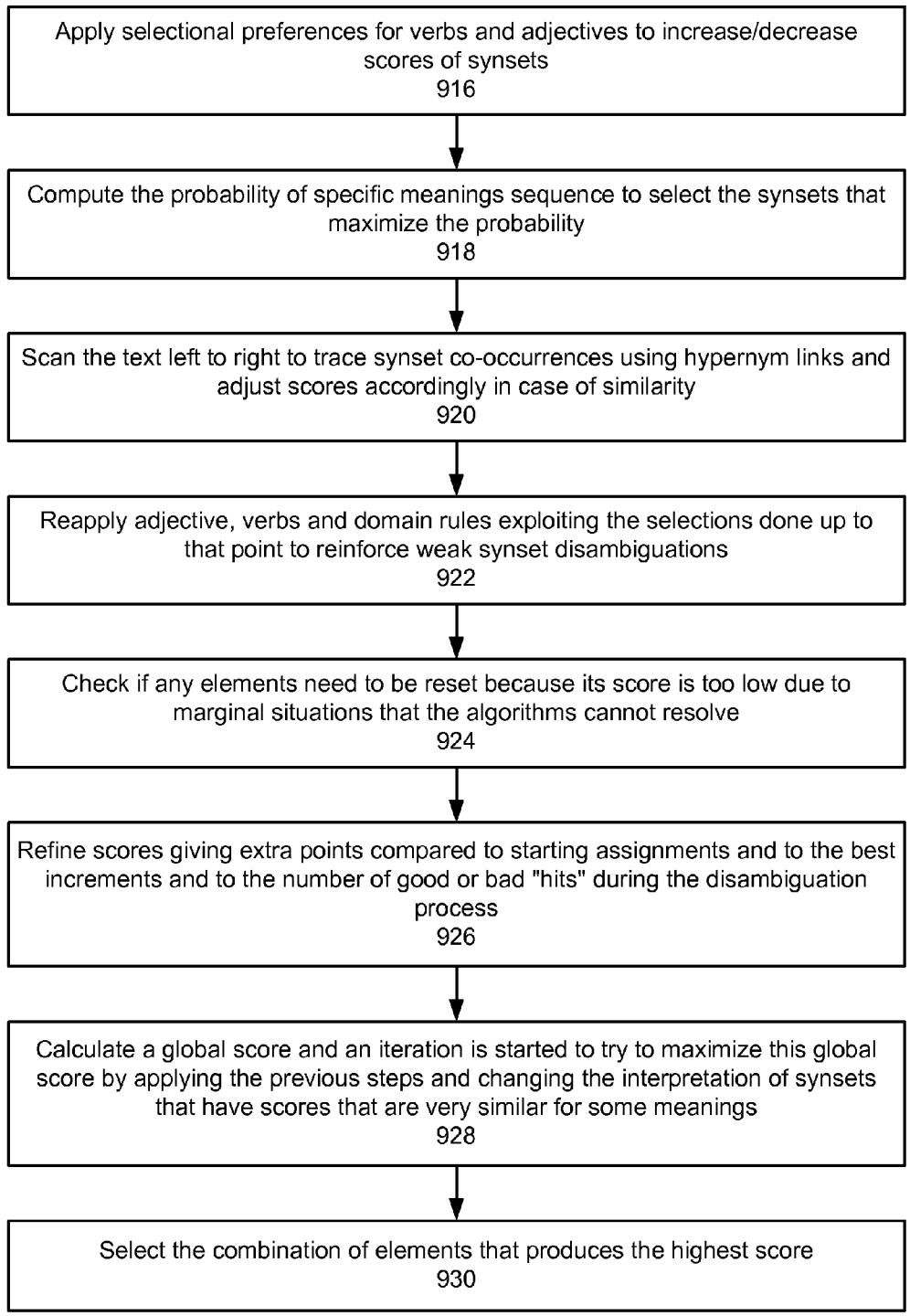

FIGS. 9A and 9B are block diagrams illustrating in further detail the process performed during the semantic disambiguation stage 28 in accordance with an exemplary embodiment. As an overview, during the semantic disambiguation stage 28, the linguistic processor 16 extracts relevant elements from input text 18, and identifies the possible meanings of the selected element by accessing the semantic network 12 to verify the compatibility of each possible meaning with the compatible meanings of the elements when combined with other elements from the input text 18. A score is then assigned to all compatible combinations of meanings based on semantic information extracted from the semantic network 12, such as domain frequencies, etc.

The process begins by the linguistic processor 16 performing a pre-parsing step that scans the whole text 18 and extracts as relevant elements potential semantic groups, e.g., named entities that are recognizable without consideration of the context in the phrase in which they appear (out of context) or in a small context environment (block 902).

For each of the elements tagged during part-of-speech tagging, the linguistic processor 16 finds possible meanings for the elements by using the elements to search for matching lemmas in the semantic network 12, and to access and retrieve a set of possible synsets containing the matching lemmas, which includes all the synsets containing the matching lemmas minus the synsets not allowed by grammatical rules (such as plural for singular-only synsets and so on) and euristic synsets (alias of euristic collocations—allowed unknown meanings for uppercase noun and so on) (block 904).

For each of the elements, the linguistic processor 16 uses the meanings of the set of retrieved synsets to search for possible clone elements in the text 18, which are elements that having a similar environment that can be kept together even if in different parts of the text, and creates a list of the clone elements discovered in text 18 (block 906).

The linguistic processor 16 assigns a base score to each of the possible synsets using lemma attributes, such as frequency (block 908). The linguistic processor 16 then analyzes the categories 500 to which the scored synsets belong in order to calculate a global category matrix that keeps track which categories each of the elements belong to, and assigns another score to each of the elements based on the categories 500 of the scored synsets (block 910).

The linguistic processor 16 then analyzes the scored synsets and modifies the scores bases on the synset/corpus links in a near context of each of the elements. That is, scanning semantic database 12 for ancestors (the hypernym of the synset/concept currently being analyzed) and modifying the score based on the semantic distance in the tree between the potential synset/concept and the other synsets/concepts that share the same hypernym (block 912).

The linguistic processor 16 then analyzes nouns order and adjectives linked to nouns by searching for explicit links between these elements inside the semantic network 12 and using linguistic rules and links to adjust the scores of synsets (block 914).

The linguistic processor 16 applies selectional preferences using well-known processes for verbs and adjectives to increase/decrease scores of synsets (block 916).

The linguistic processor 16 computes the probability of specific meanings sequence to select the synsets that maximize the probability (block 918).

The linguistic processor 16 scans the text left to right to trace synset co-occurrences using hypernym links, taking into consideration even geographical information, and adjusts scores accordingly in case of similarity (block 920).

The linguistic processor 16 reapplies adjective, verbs and domains rules exploiting the selections done up to that point to reinforce weak synset disambiguations (block 922).

The linguistic processor 16 checks if any elements need to be reset because its score is too low due to marginal situations that the algorithms cannot resolve (block 924)

The linguistic processor 16 refines scores giving extra points compared to starting assignments and to the best increments and to the number of good or bad "hits" during the disambiguation process (block 926).

The linguistic processor 16 calculates a global score and an iteration is started to try to maximize this global score by applying the previous steps and changing the interpretation of synsets that have scores that are very similar for some meanings (block 928).

When the iteration is complete, the linguistic processor 16 selects the combination of elements that produces the highest score (block 930).

The following is an example of how the score is calculated. Once a combination of terms is identified as feasible, then a probability weight is assigned to the combination based on factor such as the frequency of the combination in the general language, the frequency in the specific domain, and so on. For example, consider the input phrase "John saw the end is near". This combination of concepts in the English language is frequently linked to the end of life—death. So without any other information the system 10, assigns a higher score to this meaning compared to a runner seeing the end of a race. If instead, the phrase was "John ran by the sign of the 42nd Km and saw the end is near". The system 10 identifies the main and subordinate clauses, determines from the main clause that the domain is running, and assigns a different score to the subordinate clause, which contains the same combination of words as the previous example "saw the end near", because in this domain (running) the most common meaning would be seeing the end of a race.

A method and system for automatically extracting relations between concepts included in text has been disclosed. The method and system enable deep linguistic analysis and disambiguation of text in a manner that ensures a complete understanding of the context of the text and the relations between the elements of the text independently from the contextual reference of the corpus of the text. In addition, the method and system does not rely on statistics nor require pre-training.

The present invention has been described in accordance with the embodiments shown, and one of ordinary skill in the art will readily recognize that there could be variations to the embodiments, and any variations would be within the spirit and scope of the present invention. In addition, the embodiments can be implemented using hardware, software, a computer readable medium containing program instructions, or a combination thereof. Software written according to the present invention is to be either stored in some form of computer-readable medium such as memory or CD-ROM, and is to be executed by a processor. Accordingly, many modifications may be made by one of ordinary skill in the art without departing from the spirit and scope of the appended claims.

I claim:

1. A system for automatically extracting relations between concepts included in electronic text, comprising:
    a semantic network comprising a plurality of lemmas that are grouped into synsets representing concepts, each of the synsets having a corresponding sense, and a plurality of links connected between the synsets that represent semantic relations between the synsets; wherein the semantic network further includes semantic information comprising at least one of:
        an expanded set of semantic relation links representing: hierarchical semantic relations, synset/corpus semantic relations verb/subject semantic relations, verb/direct object semantic relations, and fine grain/coarse grain semantic relationship;
        a hierarchical category tree having a plurality of categories, wherein each of the categories contains a group of one or more synsets and a set of attributes, wherein the set of attributes of each of the categories are associated with each of the synsets in the respective category; and
        a plurality of domains, wherein one or more of the domains is associated with at least a portion of the synsets, wherein each domain adds information regarding a linguistic context in which the corresponding synset is used in a language; and
    a linguistic engine for performing semantic disambiguation on the electronic text using the at least one of the expanded set of semantic relation links, the hierarchical category tree, and the plurality of domains to assign a respective one of the senses to elements in the electronic text independently from contextual reference of the electronic text.

2. The system of claim 1 wherein the linguistic processor performs the semantic disambiguation by:
    identifying structural elements in the text;
    for each structural element, searching the semantic network to find a matching lemma;
    using the expanded set of semantic relation links of the synsets containing the matching lemma to retrieve the senses of related synsets;
    using the categories and domains for disambiguating the senses of synsets having common lemmas.

3. The system of claim 1 wherein after performing the semantic disambiguation, the linguistic processor outputs a representation of the respective senses assigned to the elements and relationships between the elements of the text.

4. The system of claim 1 wherein system is used for at least one of: natural language processing; electronic searches; automatic classification of documents; and targeted extraction of information from unstructured textual sources.

5. The system of claim 1 wherein The system is used for electronic searches as a semantic-based ranking system for a search engine in which documents returned from a keyword search are analyzed to identify concepts contained in the documents and then ranked using a specific relevance that a concept has inside the documents.

6. The system of claim 1 wherein the semantic network includes an expanded definition of a lemma such that the semantic network can store each lemma as any one of:
    a single word,
    a compound word,
    a collocation,
    an idiomatic expression,
    a locution, and
    a verbal lemma.

7. The system of claim 1 wherein the expanded set of semantic relation links further include links representing:
    adjective/class
    synset/class
    synset/geography
    adverb/adjective
    adverb/adverb
    adverb/substantive
    adverb/verb.

8. The system of claim 1 wherein each of the domains is a word that indicates a linguistic context in which an associated synset is used in a particular language.

9. The system of claim 8 wherein the domains are organized in a hierarchy of levels.

10. The system of claim 8 wherein each of the synset may only be associated with at most two of the domains.

11. The system of claim 8 wherein for each association between one of the domains and one of the synsets, a weight referred to as a domain percentage is assigned to indicate how frequently a meaning related to the synset is used in context of the associated domain versus use of synset's meaning to the synset in common general language.

12. The system of claim 1 wherein each synset may belong to more than one category, each category having all the attributes of a father category, plus one or more specific distinctive attribute.

13. The system of claim 12 wherein top-level categories in the category tree include: Objects, Animals, Plants, People, Concepts, Places, Time, Natural Phenomena, States, Quantity, and Groups.

14. The system of claim 13 wherein the synsets are assigned to different categories that have different attributes to avoid losing information that is important for disambiguation.

15. The system of claim 1 wherein the semantic network includes the hierarchical category tree, the semantic network further includes a set of attributes stored in association with the synsets to limit situations in which one of the synsets is linked to multiple category chains, thereby increasing speed of linguistic analysis.

16. The system of claim 15 wherein a different set of attributes is associated with noun synsets, verb synsets, and adjective synsets.

17. The system of claim 16 wherein the attributes associated with the noun synsets include: Place, Time, Solid, Liquid, and Gas.

18. The system of claim 16 wherein the attributes associated with the verb synsets include: a Grammar Type, a List of Likely Subject(s), and a List of Likely Direct Object(s).

19. The system of claim 16 wherein the attributes associated with the adjective synsets include: Precedes Noun; Degree; Connotation; Relationship Synset/Lemma; and Class.

20. The system of claim 1 wherein the linguistic processor includes a sentence identification stage, a token extraction stage, a morphological and grammatical analysis stage, a sentence analysis stage, and a semantic disambiguation stage.

21. The system of claim 20 wherein the morphological and grammatical analysis stage performs grammatical disambiguation using information in the semantic network and rules for grammatical disambiguation, heuristics for morphology, heuristics for named entities, and language specific rules.

22. The system of claim 20 wherein the a sentence analysis stage uses information in the semantic network and analysis rules to identify structural elements of each sentence, including subject/object/verb, complements, and main and subordinate clauses.

23. The system of claim 20 wherein the semantic disambiguation stage uses rules for semantic disambiguation and the information in the semantic network to assign meaning to lemmas, and to identify polysemic words present in the text.

24. The system of claim 23 wherein the semantic disambiguation stage traverses links in the semantic network to associate each lemma from the text with one of the senses chosen from the predetermined set of senses in the semantic network, and uses a recursive optimization algorithm to calculate the best possible meaning to assign to each identified polysemic word.

25. The system of claim 1 wherein each of the synsets is stored in a table and is defined by fields including: a synset ID, a grammar type, a list of lemmas, a set of attributes, a set of semantic links, and a gloss.

26. The system of claim 25 wherein each lemma and is defined by fields including: a list of synset IDs, and lemma attributes.

27. The system of claim 26 wherein the lemma attributes include: a GRAM, a frequency, and register, wherein
the GRAM contains two fields for specifying a number (singular/plural) and inflexions for the lemma,
the frequency is a value used to rank frequency of use of all the synset meanings that a lemma has, and
the register comprises a list of words specifying expressive meaning of a lemma.

28. A method for automatically extracting relations between concepts included in electronic text, comprising:
accessing, by a program executing on a computer, a semantic network, wherein the semantic network comprises a plurality of lemmas that are grouped into synsets representing concepts, each of the synsets having a corresponding sense, and a plurality of links connected between the synsets that represent semantic relations between the synsets; wherein the semantic network further includes semantic information comprising at least one of:
an expanded set of semantic relation links representing: hierarchical semantic relations, synset/corpus semantic relations verb/subject semantic relations, verb/direct object semantic relations, and fine grain/coarse grain semantic relationship;
a hierarchical category tree having a plurality of categories, wherein each of the categories contains a group of one or more synsets and a set of attributes, wherein the set of attributes of each of the categories are associated with each of the synsets in the respective category; and
a plurality of domains, wherein one or more of the domains is associated with at least a portion of the synsets, wherein each domain adds information regarding a linguistic context in which the corresponding synset is used in a language; and
performing, by the program, semantic disambiguation on the electronic text using the semantic network and the at least one of the expanded set of semantic relation links, the hierarchical category tree, and the plurality of domains to assign a respective one of the senses to elements in the electronic text independently from contextual reference of the electronic text.

29. The method of claim 28 further comprising performing the semantic disambiguation by:
identifying structural elements in the text;
for each structural element, searching the semantic network to find a matching lemma;
using the expanded set of semantic relation links of the synsets containing the matching lemma to retrieve the senses of related synsets;
using the categories and domains for disambiguating the senses of synsets having common lemmas.

30. The method of claim 28 wherein after performing the semantic disambiguation, The method comprises outputting a representation of the respective senses assigned to the elements and relationships between the elements of the text.

31. The method of claim 28 wherein method is used for at least one of: natural language processing; electronic searches; automatic classification of documents; and targeted extraction of information from unstructured textual sources.

32. The method of claim 28 wherein The method is used for electronic searches as a semantic-based ranking method for a search engine in which documents returned from a keyword search are analyzed to identify concepts contained in the documents and then ranked using a specific relevance that a concept has inside the documents.

33. The method of claim 28 wherein the semantic network includes an expanded definition of a lemma such that the semantic network can store each lemma as any one of:

a single word,
a compound word,
a collocation,
an idiomatic expression,
a locution, and
a verbal lemma.

34. The method of claim 28 wherein the expanded set of semantic relation links further include links representing:
adjective/class
synset/class
synset/geography
adverb/adjective
adverb/adverb
adverb/substantive
adverb/verb.

35. The method of claim 28 wherein each of the domains is a word that indicates a linguistic context in which an associated synset is used in a particular language.

36. The method of claim 35 wherein the domains are organized in a hierarchy of levels.

37. The method of claim 35 wherein each of the synset may only be associated with at most two of the domains.

38. The method of claim 35 wherein for each association between one of the domains and one of the synsets, a weight referred to as a domain percentage is assigned to indicate how frequently a meaning related to the synset is used in context of the associated domain versus use of synset's meaning to the synset in common general language.

39. The method of claim 28 wherein each synset may belong to more than one category, each category having all the attributes of a father category, plus one or more specific distinctive attribute.

40. The method of claim 39 wherein top-level categories in the category tree include: Objects, Animals, Plants, People, Concepts, Places, Time, Natural Phenomena, States, Quantity, and Groups.

41. The method of claim 40 wherein the synsets are assigned to different categories that have different attributes to avoid losing information that is important for disambiguation.

42. The method of claim 28 wherein the semantic network includes the hierarchical category tree, the semantic network further includes a set of attributes stored in association with the synsets to limit situations in which one of the synsets is linked to multiple category chains, thereby increasing speed of linguistic analysis.

43. The method of claim 42 wherein a different set of attributes is associated with noun synsets, verb synsets, and adjective synsets.

44. The method of claim 43 wherein the attributes associated with the noun synsets include: Place, Time, Solid, Liquid, and Gas.

45. The method of claim 43 wherein the attributes associated with the verb synsets include: a Grammar Type, a List of Likely Subject(s), and a List of Likely Direct Object(s).

46. The method of claim 43 wherein the attributes associated with the adjective synsets include: Precedes Noun; Degree; Connotation; Relationship Synset/Lemma; and Class.

47. The method of claim 28 wherein the program further comprises a linguistic processor that includes a sentence identification stage, a token extraction stage, a morphological and grammatical analysis stage, a sentence analysis stage, and a semantic disambiguation stage.

48. The method of claim 47 wherein the morphological and grammatical analysis stage performs grammatical disambiguation using information in the semantic network and rules for grammatical disambiguation, heuristics for morphology, heuristics for named entities, and language specific rules.

49. The method of claim 47 wherein the a sentence analysis stage uses information in the semantic network and analysis rules to identify structural elements of each sentence, including subject/object/verb, complements, and main and subordinate clauses.

50. The method of claim 47 wherein the semantic disambiguation stage uses rules for semantic disambiguation and the information in the semantic network to assign meaning to lemmas, and to identify polysemic words present in the text.

51. The method of claim 50 wherein the semantic disambiguation stage traverses links in the semantic network to associate each lemma from the text with one of the senses chosen from the predetermined set of senses in the semantic network, and uses a recursive optimization algorithm to calculate the best possible meaning to assign to each identified polysemic word.

52. The method of claim 28 wherein each of the synsets is stored in a table and is defined by fields including: a synset ID, a grammar type, a list of lemmas, a set of attributes, a set of semantic links, and a gloss.

53. The method of claim 52 wherein each lemma and is defined by fields including: a list of synset IDs, and lemma attributes.

54. The method of claim 53 wherein the lemma attributes include: a GRAM, a frequency, and register, wherein
the GRAM contains two fields for specifying a number (singular/plural) and inflexions for the lemma,
the frequency is a value used to rank frequency of use of all the synset meanings that a lemma has, and
the register comprises a list of words specifying expressive meaning of a lemma.

55. An executable software product stored on a computer-readable medium containing program instructions for automatically extracting relations between concepts included in electronic text, the program instructions for:
accessing, by a program executing on a computer, a semantic network comprising a plurality of lemmas that are grouped into synsets representing concepts, each of the synsets having a corresponding sense, and a plurality of links connected between the synsets that represent semantic relations between the synsets; wherein the semantic network further includes semantic information comprising at least one of:
an expanded set of semantic relation links representing: hierarchical semantic relations, synset/corpus semantic relations verb/subject semantic relations, verb/direct object semantic relations, and fine grain/coarse grain semantic relationship;
a hierarchical category tree having a plurality of categories, wherein each of the categories contains a group of one or more synsets and a set of attributes,
wherein the set of attributes of each of the categories are associated with each of the synsets in the respective category; and
a plurality of domains, wherein one or more of the domains is associated with at least a portion of the synsets, wherein each domain adds information regarding a linguistic context in which the corresponding synset is used in a language; and
performing, by the program, semantic disambiguation on the electronic text using the semantic network and the at least one of the expanded set of semantic relation links, the hierarchical category tree, and the plurality of domains to assign a respective one of the senses to elements in the electronic text independently from contextual reference of the electronic text.

* * * * *

UNITED STATES PATENT AND TRADEMARK OFFICE
CERTIFICATE OF CORRECTION

| | | |
|---|---|---|
| PATENT NO. | : 7,899,666 B2 | Page 1 of 2 |
| APPLICATION NO. | : 11/744479 | |
| DATED | : March 1, 2011 | |
| INVENTOR(S) | : Varone | |

It is certified that error appears in the above-identified patent and that said Letters Patent is hereby corrected as shown below:

Column 23, line 63, replace the first occurrence of "relations" with --relations,--.

Column 24, line 17, replace "processor" with --engine--.

Column 24, line 28, replace "processor" with --engine--.

Column 24, line 31, after "wherein" insert --the--.

Column 24, line 34, replace "wherein The" with --wherein the--.

Column 24, line 51, cancel the text beginning with "adjective/class" through "adverb/verb." and insert the following:
--adjective/class,
synset/class,
synset/geography,
adverb/adjective,
adverb/adverb,
adverb/substantive, and
adverb/verb.--.

Column 26, line 21, replace the first occurrence of "relations" with --relations,--.

Column 26, line 52, replace "The method" with --the method--.

Column 26, line 55, after "wherein" insert --the--.

Column 26, line 59, replace "wherein The" with --wherein the--.

Signed and Sealed this
Fifteenth Day of January, 2013

David J. Kappos
*Director of the United States Patent and Trademark Office*

CERTIFICATE OF CORRECTION (continued)
U.S. Pat. No. 7,899,666 B2

Column 27, line 8, cancel the text beginning with "adjective/class" through "adverb/verb." and insert the following:
--adjective/class,
synset/class,
synset/geography,
adverb/adjective,
adverb/adverb,
adverb/substantive, and
adverb/verb.--.

Column 28, line 45, replace the first occurrence of "relations" with --relations,--.